US012566764B2

(12) United States Patent
    Carbune et al.

(10) Patent No.: US 12,566,764 B2
(45) Date of Patent: *Mar. 3, 2026

(54) AMBIENT MULTI-DEVICE FRAMEWORK FOR AGENT COMPANIONS

(71) Applicant: Google LLC, Mountain View, CA (US)

(72) Inventors: Victor Carbune, Zürich (CH); Arash Sadr, Belmont, CA (US); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/823,950

(22) Filed: Sep. 4, 2024

(65) Prior Publication Data

US 2025/0209076 A1     Jun. 26, 2025

Related U.S. Application Data

(63) Continuation of application No. 18/390,768, filed on Dec. 20, 2023, now Pat. No. 12,111,834.

(51) Int. Cl.
    *G06F 16/00*       (2019.01)
    *G06F 16/2455*     (2019.01)
    *G06F 16/248*      (2019.01)

(52) U.S. Cl.
    CPC ...... *G06F 16/24553* (2019.01); *G06F 16/248* (2019.01)

(58) Field of Classification Search
    CPC .......................... G06F 16/24553; G06F 16/248
    (Continued)

(56) References Cited

U.S. PATENT DOCUMENTS

| 10,397,355 B2 | 8/2019 | Hajj et al. |
| 11,449,777 B1 | 9/2022 | Sathe |

(Continued)

FOREIGN PATENT DOCUMENTS

| CN | 116702737 | 9/2023 |
| CN | 117112759 | 11/2023 |

(Continued)

OTHER PUBLICATIONS

Extended European Search Report for Application No. EP 24213057. 3, mailed Mar. 5, 2025, 12 pages.

(Continued)

*Primary Examiner* — Michelle N Owyang
(74) *Attorney, Agent, or Firm* — DORITY & MANNING P.A.

(57) ABSTRACT

Systems and methods for generating and providing outputs in a multi-device system can include leveraging environment-based prompt generation and generative model response generation to provide dynamic response generation and display. The systems and methods can obtain input data associated with one or more computing devices within an environment, can obtain environment data descriptive of the plurality of computing devices within the environment, and can generate a prompt based on the input data and environment data. The prompt can be processed with a generative model to generate a model-generated output. The model-generated output can then be transmitted to a particular computing device of the plurality of computing devices.

20 Claims, 16 Drawing Sheets

(58) Field of Classification Search
USPC .................................................. 707/600–899
See application file for complete search history.

(56) References Cited

U.S. PATENT DOCUMENTS

| | | |
|---|---|---|
| 11,790,005 B2 | 10/2023 | Sharifi et al. |
| 2019/0378506 A1 | 12/2019 | Garikapati et al. |
| 2020/0184992 A1 | 6/2020 | Newell et al. |
| 2022/0357801 A1 | 11/2022 | Udall et al. |
| 2022/0404949 A1 | 12/2022 | Berquam et al. |
| 2023/0217059 A1* | 7/2023 | D'Amato ......... H04N 21/43615 |
| | | 725/78 |
| 2024/0296643 A1* | 9/2024 | Woodard, Jr. .......... G06T 19/20 |
| 2024/0310900 A1* | 9/2024 | Kocienda ............... G06V 20/50 |
| 2025/0165698 A1* | 5/2025 | Hernandez Rivera ...................... |
| | | G06F 40/166 |

FOREIGN PATENT DOCUMENTS

| | | |
|---|---|---|
| EP | 4407410 | 7/2024 |
| WO | WO 2018213415 | 11/2018 |
| WO | WO 2023083262 | 5/2023 |

OTHER PUBLICATIONS

Chinese Search Report Corresponding to Application No. 2024116252519 on Jun. 19, 2025.

* cited by examiner

300

302

OBTAIN INPUT DATA

304

OBTAIN ENVIRONMENT DATA

306

GENERATE A PROMPT BASED ON THE INPUT DATA AND
THE ENVIRONMENT DATA

308

PROCESS THE PROMPT WITH A GENERATIVE MODEL TO
GENERATE A MODEL-GENERATED OUTPUT

310

TRANSMIT THE MODEL-GENERATED OUTPUT TO THE
PARTICULAR COMPUTING DEVICE

602

604

606

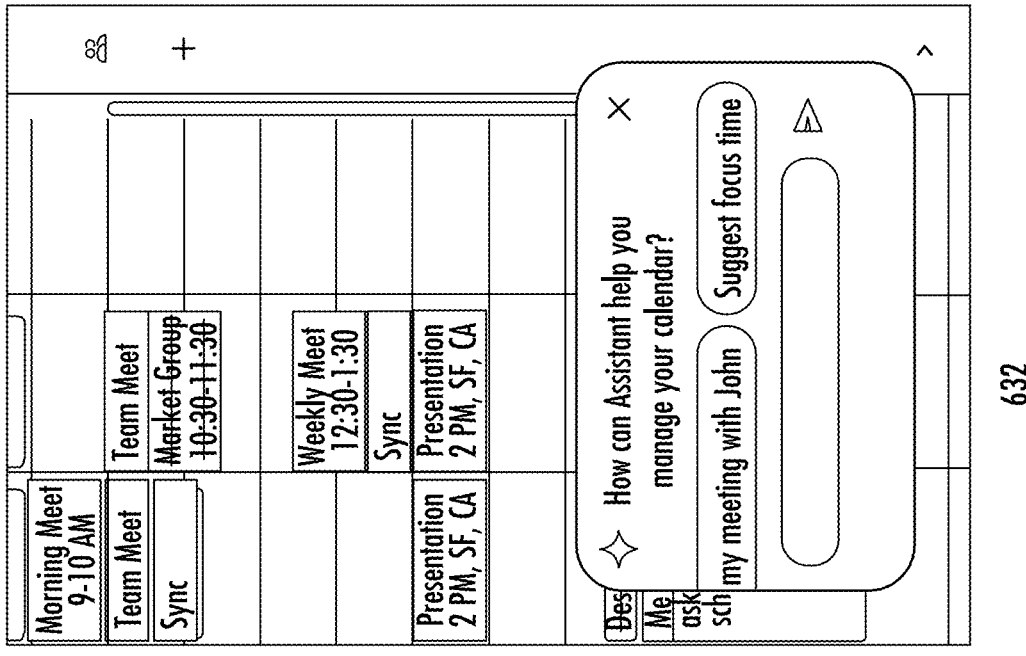
632
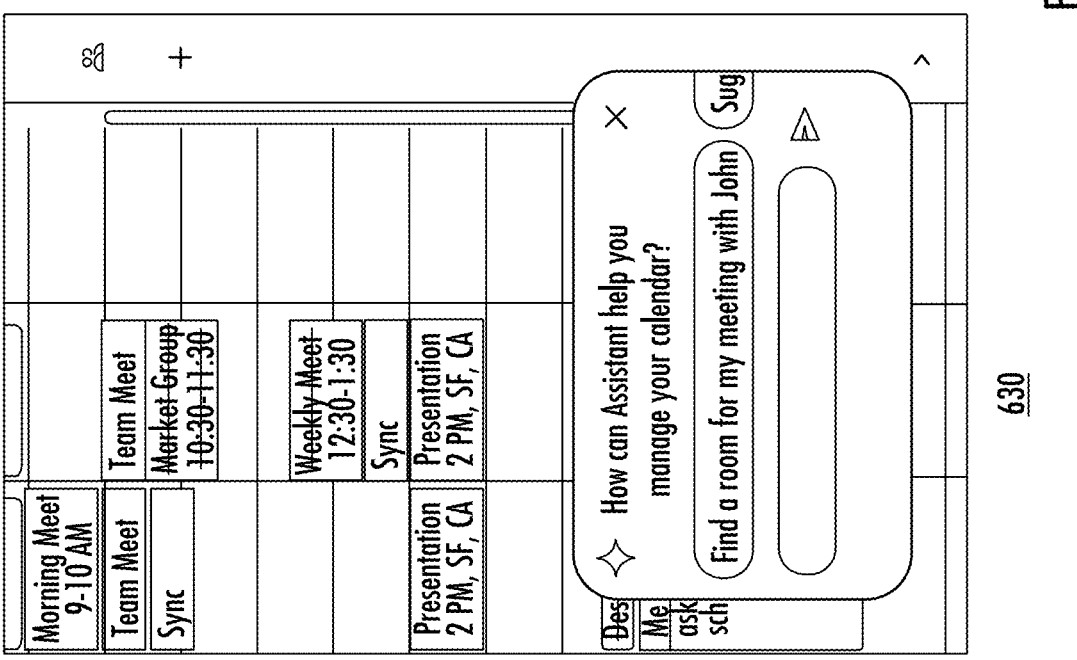
630
FIG. 6D

636

634

640

638

700

702 — OBTAIN INPUT DATA

704 — OBTAIN ENVIRONMENT DATA

706 — GENERATE A PROMPT BASED ON THE INPUT DATA AND THE ENVIRONMENT DATA

708 — PROCESS THE PROMPT WITH A GENERATIVE MODEL TO GENERATE A MODEL-GENERATED OUTPUT AND OUTPUT DEVICE INSTRUCTIONS

710 — TRANSMIT THE MODEL-GENERATED OUTPUT TO THE PARTICULAR COMPUTING DEVICE BASED ON THE OUTPUT DEVICE INSTRUCTIONS

800

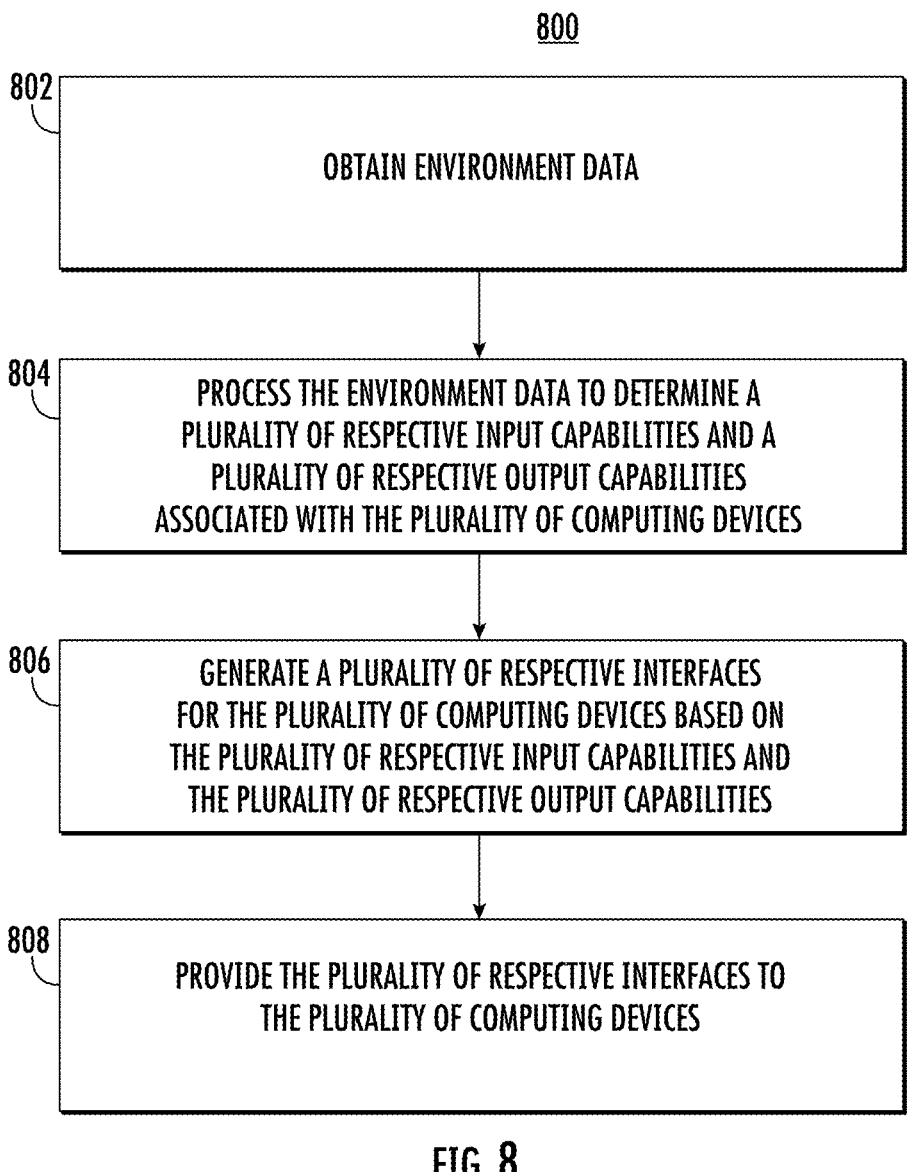

802 OBTAIN ENVIRONMENT DATA

804 PROCESS THE ENVIRONMENT DATA TO DETERMINE A PLURALITY OF RESPECTIVE INPUT CAPABILITIES AND A PLURALITY OF RESPECTIVE OUTPUT CAPABILITIES ASSOCIATED WITH THE PLURALITY OF COMPUTING DEVICES

806 GENERATE A PLURALITY OF RESPECTIVE INTERFACES FOR THE PLURALITY OF COMPUTING DEVICES BASED ON THE PLURALITY OF RESPECTIVE INPUT CAPABILITIES AND THE PLURALITY OF RESPECTIVE OUTPUT CAPABILITIES

808 PROVIDE THE PLURALITY OF RESPECTIVE INTERFACES TO THE PLURALITY OF COMPUTING DEVICES

FIG. 8

AMBIENT MULTI-DEVICE FRAMEWORK FOR AGENT COMPANIONS

RELATED APPLICATIONS

The present application is a continuation of U.S. application Ser. No. 18/390,768 having a filing date of Dec. 20, 2023. Applicant claims priority to and the benefit of each of such application and incorporate all such application herein by reference in its entirety.

FIELD

The present disclosure relates generally to generating and providing outputs in a multi-device system. More particularly, the present disclosure relates to conditioning output generation based on the devices in an environment and determining which computing device to provide the output.

BACKGROUND

Computing devices can be found throughout a user's living room, bedroom, study, office, and/or other environments. Multiple device environments can provide a user with a plurality of computing devices to interact with, which can include smart televisions, smart speakers, smart appliances, virtual assistant devices, tablets, smart wearables, smartphones, and/or other computing devices can be provided throughout a user's environment. However, the capabilities of these devices may not be utilized based on the lack of interconnectivity between devices. For example, a user may be performing searches with a smartphone, which may cause playback of video search results on the smartphone, while a smart television is a few feet away.

Understanding the world at large can be difficult. Whether an individual is trying to understand what the object in front of them is, trying to determine where else the object can be found, and/or trying to determine where an image on the internet was captured from, text searching alone can be difficult. In particular, users may struggle to determine which words to use. Additionally, their words may not be descriptive enough and/or abundant enough to generate desired results.

SUMMARY

Aspects and advantages of embodiments of the present disclosure will be set forth in part in the following description, or can be learned from the description, or can be learned through practice of the embodiments.

One example aspect of the present disclosure is directed to a computing system for determining an output device for providing a query response. The system can include one or more processors and one or more non-transitory computer-readable media that collectively store instructions that, when executed by the one or more processors, cause the computing system to perform operations. The operations can include obtaining input data. The input data can include a query associated with a particular user. The operations can include obtaining environment data. The environment data can be descriptive of a plurality of computing devices in an environment of the user. In some implementations, the plurality of computing devices can be associated with a plurality of different output components. The operations can include generating a prompt based on the input data and the environment data. The prompt can include data descriptive of the query and device information associated with at least a subset of the plurality of computing devices. The operations can include processing the prompt with a generative model to generate a model-generated output. The model-generated output can include a response to the query. In some implementations, the model-generated output can be generated to be provided with a particular computing device of the plurality of computing devices. The operations can include transmitting the model-generated output to the particular computing device.

In some implementations, the model-generated output can be generated to be provided with a particular output component of the plurality of different output components. The generative model can generate output device instructions. The output device instructions can be descriptive of a particular computing device of the plurality of computing devices to provide the model-generated output. The particular computing device can be associated with the particular output component. The model-generated output can be transmitted to the particular computing device based on the output device instructions.

In some implementations, processing the prompt with the generative model to generate the model-generated output can include generating a plurality of model outputs. The plurality of model outputs can include a plurality of candidate responses. Transmitting the model-generated output to the particular computing device can include transmitting a first model output of the plurality of model outputs to a first computing device of the plurality of computing devices and transmitting a second model output of the plurality of model outputs to a second computing device of the plurality of computing devices. The first model output can include visual data for display via a visual display. The second model output can include audio data for playback via a speaker component. In some implementations, the first computing device can include a smart television, and wherein the second computing device comprises a smart speaker.

In some implementations, generating the prompt based on the input data and the environment data can include determining an environment-specific device configuration based on the environment data, obtaining a prompt template from a prompt library based on the environment-specific device configuration, and augmenting the prompt template based on the input data to generate the prompt. The environment-specific device configuration can be descriptive of respective output types and respective output quality for the plurality of computing devices. The prompt library can include a plurality of different prompt templates associated with a plurality of different device configurations.

In some implementations, the plurality of computing devices can be connected via a cloud computing system. Each of the plurality of computing devices can be registered with a platform of the cloud computing system. The environment data can be obtained with the cloud computing system. The model-generated output can be transmitted via the cloud computing system. In some implementations, the plurality of computing devices can be located proximate to each of the other computing devices within the plurality of computing devices. The plurality of computing devices can be communicatively connected over a local network. A particular computing device of the plurality of computing devices may facilitate input data obtainment and model-generated output transmission.

In some implementations, the generative model can be communicatively connected with a search engine via an application programming interface. Processing the prompt with the generative model to generate the model-generated output can include generating an application programming interface call based on the prompt, determining a plurality of search results with the search engine based on the application programming interface call, and processing the plurality of search results with the generative model to generate the model-generated output.

Another example aspect of the present disclosure is directed to a computer-implemented method. The method can include obtaining, by a computing system including one or more processors, input data. The input data can include a query associated with a particular user. The method can include obtaining, by the computing system, environment data. The environment data can be descriptive of a plurality of computing devices in an environment of the user. The plurality of computing devices can be associated with a plurality of different output components. The method can include generating, by the computing system, a prompt based on the input data and the environment data. The prompt can include data descriptive of the query and device information associated with at least a subset of the plurality of computing devices. The method can include processing, by the computing system, the prompt with a generative model to generate a model-generated output and output device instructions. The model-generated output can include a response to the query. In some implementations, the model-generated output can be generated to be provided with a particular output component of the plurality of different output components. The output device instructions can be descriptive of a particular computing device of the plurality of computing devices to provide the model-generated output. The particular computing device can be associated with the particular output component. The method can include transmitting, by the computing system, the model-generated output to the particular computing device based on the output device instructions.

In some implementations, the plurality of different output components can be associated with a plurality of respective output capabilities associated with the plurality of computing devices. Each of the plurality of respective output capabilities can be descriptive of an output type and quality available via a respective computing device. The output device instructions can include an application programming interface call to transmit the model-generated output to the particular computing device. In some implementations, the plurality of different output components can include a speaker associated with a first device and a visual display associated with a second device. The method can include determining, by the computing system, the particular output component is associated with an intent of the query. The prompt can be generated based on the particular output component being associated with the intent of the query.

In some implementations, the method can include determining, by the computing system and based on the environment data, an output hierarchy based on specification information for the plurality of different output components. The prompt can be generated based on the output hierarchy and the query.

Another example aspect of the present disclosure is directed to one or more non-transitory computer-readable media that collectively store instructions that, when executed by one or more computing devices, cause the one or more computing devices to perform operations. The operations can include obtaining environment data. The environment data can be descriptive of a plurality of computing devices within an environment associated with a particular user. The operations can include processing the environment data to determine a plurality of respective input capabilities and a plurality of respective output capabilities associated with the plurality of computing devices. The plurality of respective input capabilities can be associated with candidate input types associated with the plurality of computing devices. The plurality of respective output capabilities can be associated with candidate output types associated with the plurality of computing devices. The operations can include generating a plurality of respective interfaces for the plurality of computing devices based on the plurality of respective input capabilities and the plurality of respective output capabilities. The plurality of respective interfaces can be specialized for the plurality of computing devices based on the plurality of computing devices based on the plurality of respective input capabilities and the plurality of respective output capabilities. The operations can include providing the plurality of respective interfaces to the plurality of computing devices.

In some implementations, the plurality of respective interfaces can include a plurality of device indicators that indicate the plurality of computing devices within the environment associated with the particular user. The plurality of computing devices can be configured as a user-specific device ecosystem that are communicatively connected for receiving inputs and providing outputs. Each of the plurality of respective interfaces can be configured to receive particular input types and provide particular output types based on respective input capabilities and respective output capabilities for the particular computing device of the plurality of computing devices.

In some implementations, the operations can include obtaining a user input via a first interface of a first computing device of the plurality of computing devices, processing the user input with a search engine to determine a plurality of search results, processing the plurality of search results with a generative model to generate a model output, and providing the model output for display via a second interface of a second computing device of the plurality of computing devices.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6D depicts an illustration of an example calendar interface according to example embodiments of the present disclosure.

FIG. 8 depicts a flow chart diagram of an example method to perform interface generation according to example embodiments of the present disclosure.

Figure 1:
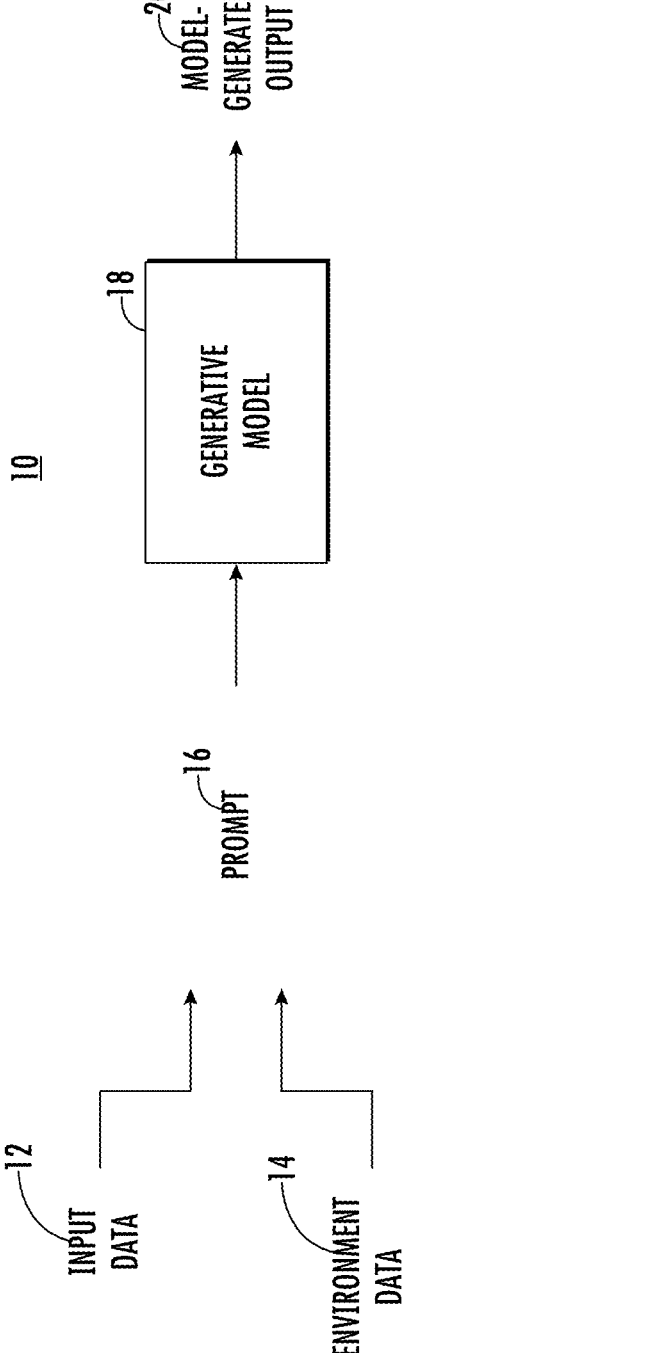
FIG. 1 depicts a block diagram of an example generative model system according to example embodiments of the present disclosure.

Reference numerals that are repeated across plural figures are intended to identify the same features in various implementations.

DETAILED DESCRIPTION

Generally, the present disclosure is directed to a multi-device framework for managing input obtainment and output generation for an environment that includes a plurality of computing devices. In particular, the systems and methods disclosed herein can leverage environment-based prompt generation and generative model processing to generate and/or provide outputs that can be generated based on the computing devices available in the environment. For example, the multi-device framework can include a computing system that facilitates obtaining input data and environment data associated with a plurality of computing devices and generating one or more model-generated outputs configured to be provided with one or more particular computing devices of the plurality of computing devices. The computing system can be utilized to leverage the diverse input and/or output capabilities of the different computing devices within the environment, which can include automatically obtaining different types of inputs from different devices and/or providing different types of outputs via the different devices (e.g., a voice command may be received via a smartphone, while the output may be provided via a visual display of a television and/or a speaker of a sound system).

Environment data associated with the plurality of computing devices within the environment can be leveraged for prompt generation, environment understanding, and/or interface generation. The environment data can be processed to generate a prompt that may condition the output generation of the generative model to be compatible with and/or optimized for display and/or playback in the user's environment. The prompt generation can include obtaining a particular prompt template from a prompt library based on the computing devices associated with the environment and/or may include prompt generation by processing the input data and/or the environment data with a machine-learned model to generate the prompt. Additionally and/or alternatively, the environment data may be processed to determine which computing devices associated with the environment to utilize for particular types of input obtainment and/or particular types of output playback. In some implementations, the environment data can be processed to understand the computing devices within the environment and generate respective interfaces for the plurality of computing devices based on the determined input and/or output capabilities of the computing devices associated with the environment.

An ambient multi-device framework can be utilized to provide an immersive virtual assistant that can receive inputs from and provide outputs with a plurality of different computing devices. The ambient multi-device framework can obtain queries and/or prompts from a user and provide a response in a relevant content type with a computing device in the environment that provides the relevant content type that may be a higher quality than other devices in the environment. The computing device determination can be based on a determined hierarchy that may be determined based on device specification information (and/or capability information for the devices).

Computing devices can be found throughout a user's environment, whether that is at the office, at home, and/or at other locations. Smart televisions, smart speakers, smart appliances, virtual assistant devices, tablets, smart wearables, smartphones, and/or other computing devices can be provided throughout a user's environment; however, the capabilities of these devices may not be utilized based on the lack of interconnectivity between devices and/or a lack of collaboration. In particular, the computing devices may not be able to determine when and/or how to interact with each other for obtaining inputs and/or providing context-specific outputs.

An ambient multi-device framework can include obtaining and/or generating information descriptive of the computing devices in an environment including information associated with input and/or output capabilities. The information can then be utilized in generating a prompt for a generative model (e.g., a large language model), which may condition what data is obtained and/or generated for output and/or what computing device is utilized for outputs associated with a user query. In some implementations, the generative model may be fine-tuned (e.g., a parameter efficient fine-tuning and/or soft prompt tuning) for the multi-device framework, which may include tuning the generative model for processing prompts with environment context and generating outputs based on both the query and the environment context.

In particular, different computing devices can have different components for different forms of input data (e.g., text input, voice commands, gesture input, etc.) capture and/or for providing different types of output data to a user (e.g., visual display, audio playback, etc.). The ambient multi-device framework can leverage the capability information associated with the computing devices in an environment to provide an immersive and multi-faceted computing system that can obtain inputs and provide outputs with a plurality of different computing systems within an environment.

Smartphones, smart watches, smart speakers, smart televisions, smart assistant devices, and/or other computing devices are around users at all times; however, the interconnectivity can be limited and the highest quality input and/or output data may not be efficiently utilized. For example, a user may input a query via their smartphone, which may cause a video and/or audio to be provided as a response on the smartphone, while a high quality smart television and/or smart speakers may be readily accessible and proximate to the user. Whether content is entertainment in nature, educational, and/or for other purposes, multi-device frameworks can be leveraged for obtaining additional forms of input and/or provide additional forms of output that may be of higher quality than a single device system.

The systems and methods disclosed herein can be utilized to manage the obtainment of inputs from multiple devices and/or providing outputs via multiple devices. In some implementations, inputs may be received from a smartphone and a smart watch, and outputs responsive to the inputs may be provided via a smart television and smart speakers. Additionally and/or alternatively, the systems and methods may determine a particular computing device within the environment has the highest processing power, and the systems and methods may then utilize the particular computing device for performing the model inferences. In some implementations, the processing tasks may be split between multiple computing devices within the environment and/or performed by a server computing system.

The systems and methods of the present disclosure provide a number of technical effects and benefits. As one example, the systems and methods can be utilized to provide an interconnected multi-device ecosystem. In particular, the systems and methods disclosed herein can obtain input data from one or more devices within the ecosystem. The systems and methods can obtain environment data descriptive of the devices within the environment and can then generate a prompt based on the input data and environment data that can be processed with a generative model to generate a response to the input data that is generated based on the devices in the environment. The response can then be transmitted to one or more particular devices within the environment. For example, a text input can be obtained via a tablet, and the output can be provided via a smart speaker.

Another example technical effect and benefit relates to improved computational efficiency and improvements in the functioning of a computing system. For example, a technical benefit of the systems and methods of the present disclosure is the ability to reduce the computational resources needed for interacting with a plurality of computing devices within an environment. In particular, the multi-device framework can centralize the processing and flow of data, which can reduce repeat processing instances among devices within the ecosystem.

The systems and methods of the present disclosure provide a number of technical effects and benefits. As one example, the systems and methods can provide an interface generation system. The interface generation system can be leveraged to generate environment-specific and device-specific interfaces that can be specifically generated based on the input capabilities and output capabilities available within a multi-device ecosystem.

Another technical benefit of the systems and methods of the present disclosure is the ability to leverage interface generation to provide an immersive multi-device environment. In particular, interfaces can be generated and provided to provide users with the capability to obtain a plurality of different input types from a plurality of different devices in an interconnected system and may provide a plurality of different output types via the plurality of different devices in the interconnected system.

With reference now to the Figures, example embodiments of the present disclosure will be discussed in further detail.

FIG. 1 depicts a block diagram of an example generative model system 10 according to example embodiments of the present disclosure. In some implementations, the generative model system 10 is configured to receive, and/or obtain, a set of input data 12 descriptive of a query and/or context and, as a result of receipt of the input data 12, generate, determine, and/or provide a model-generated output 20 that is descriptive of a response to the query. Thus, in some implementations, the generative model system 10 can include a generative model 18 that is operable to process a prompt 16 to generate a response to the query that is configured to be provided by a particular computing device in the environment.

In particular, the generative model system 10 can obtain input data 12 and environment data 14. The input data 12 can be descriptive of one or more inputs. The input data 12 can be descriptive of a query (e.g., "Who is playing today?", "How do I make focaccia?", What was the song that played at the end of the movie of the year?"). The input data 12 can include directly-input inputs (e.g., a user types into a graphical keyboard, captures an image, selects a graphical user interface element, provides a voice command, etc.) and/or contextual inputs (e.g., user search history, time of day, user habit data, user browsing history, application activity, application currently open, temperature, user location, and/or data obtained from other computing devices within the environment).

The environment data 14 can be descriptive of a plurality of computing devices within an environment. The environment can be a room, a set of rooms, a proximity to a user, and/or space that includes a plurality of computing devices proximate to one another. The environment data 14 can include specification information for each of the plurality of computing devices within the environment. Alternatively and/or additionally, the environment data 14 may be descriptive identification data for the plurality of computing devices (e.g., device names, device serial numbers, device labels, registration data, etc.), capability data for the plurality of computing devices (e.g., input capabilities for the plurality of computing devices, processing capabilities for the plurality of computing devices, and/or output capabilities for the plurality of computing devices), and/or other environment data.

The generative model system 10 can process the input data 12 and the environment data 14 to generate a prompt 16. The prompt 16 can include information associated with the query and the plurality of computing devices. The prompt 16 may include the query and an indicator of one or more candidate computing devices to provide the output with. The prompt 16 may be generated by querying a prompt library to determine a prompt template based on the environment data 14. The prompt template can then be filled-in based on the input data 12. Alternatively and/or additionally, the prompt 16 may be generated by processing the input data 12 and the environment data 14 with a prompt generation model. The prompt generation model can include a machine-learned model, which may include a generative model (e.g., an autoregressive language model, a diffusion model, a vision language model, and/or other generative models).

A generative model 18 can then process the prompt 16 to generate a model-generated output 20. The generative model 18 can include a generative language model (e.g., a large language model, vision language model, and/or other language models), an image generation model (e.g., a text-to-image generation model), and/or other generative models. The generative model 18 may include a transformer model, a convolution model, a feed-forward model, a recurrent model, a self-attention model, and/or other models.

The model-generated output 20 can include a predicted response to the query of the input data 12. The model-generated output 20 can be a novel generated output that includes a plurality of predicted features (e.g., predicted text characters, predicted audio signals, predicted pixels, etc.). The model-generated output 20 can be generated to be provided by a particular computing device of the plurality of computing devices. For example, the model-generated output 20 may be generated to be of a particular size, quality, and/or content type based on a preferred computing device (with particular capabilities) as determined based on the prompt and/or the generative model 18 processing.

The model-generated output 20 can then be provided to the particular computing device within the environment. Providing the model-generated output 20 to the particular computing device can include transmitting the data, which may include generating an application programming interface call with the generative model and performing the API call with one or more application programming interfaces. The particular computing device can then provide the model-generated output 20 to the user (e.g., via a visual display, a speaker, and/or other output components of the particular computing device).

Figure 2:
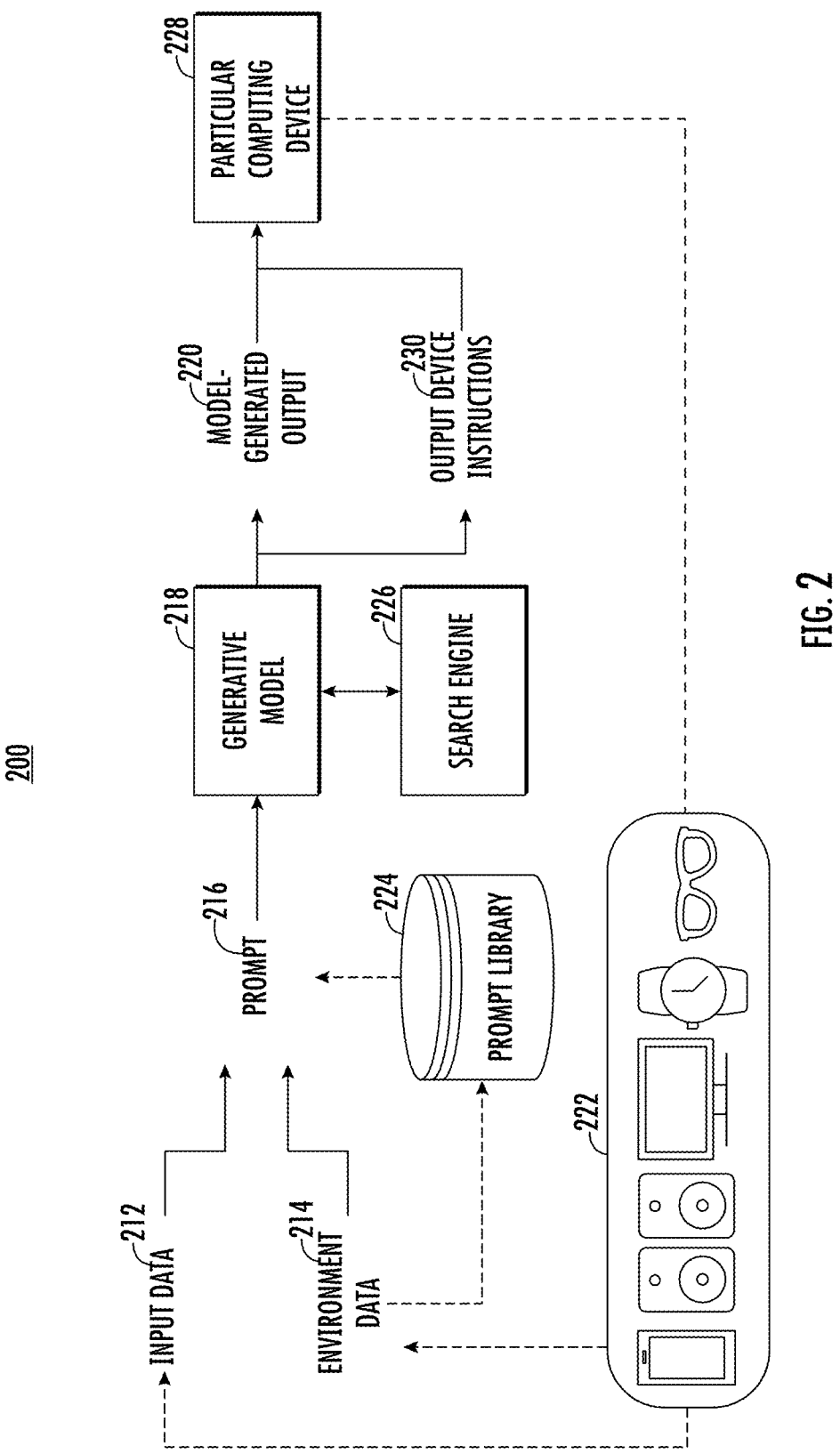
FIG. 2 depicts a block diagram of an example response generation system according to example embodiments of the present disclosure.

FIG. 2 depicts a block diagram of an example response generation system 200 according to example embodiments of the present disclosure. The response generation system 200 is similar to generative model system 10 of FIG. 1 except that response generation system 200 further includes a prompt library 224 and search engine 226.

In particular, the response generation system 200 can obtain input data 212 and environment data 214. The input data 212 can include text data, image data, audio data, embedding data, signal data, search history data, browsing history data, application interaction data, latent encoding data, multimodal data, global data, and/or other data. The input data 212 can be descriptive of one or more inputs, which may include obtaining inputs from multiple computing devices within the environment. The input data 212 can be descriptive of a query (e.g., "Who is playing today?", "How do I make focaccia?", What was the song that played at the end of the movie of the year?"). The input data 212 can include directly-input inputs (e.g., a user types into a graphical keyboard, captures an image, selects a graphical user interface element, provides a voice command, etc.) and/or context inputs (e.g., user search history, time of day, user habit data, user browsing history, application activity, application currently open, temperature, user location, and/or data obtained from other computing devices within the environment). The input data 12 may include context data determined to be relevant to the query. Alternatively and/or additionally, the input data 12 may include a predicted query that may be generated based on a prediction of what might be of interest to the user based on one or more determined user contexts (e.g., a determined interest in a particular football team, a sequence of searches may be utilized to determine a possible interest in horror movies, and/or determine a particular product for purchase may be of interest based on similar products being purchased). In some implementations, the response generation system 200 may suggest content to the user by generating input data based on personalization signals and/or contextualization signals.

The environment data 214 can be descriptive of a plurality of computing devices 222 within an environment. The environment can be a room, a set of rooms, a proximity to a user, and/or space that includes a plurality of computing devices proximate to one another. The environment data 214 can include specification information for each of the plurality of computing devices 222 within the environment. Alternatively and/or additionally, the environment data 214 may be descriptive identification data for the plurality of computing devices 222 (e.g., device names, device serial numbers, device labels, registration data, etc.), capability data for the plurality of computing devices 222 (e.g., input capabilities for the plurality of computing devices 222, processing capabilities for the plurality of computing devices 222, and/or output capabilities for the plurality of computing devices 222), and/or other environment data. The plurality of computing devices 222 can include smartphones, smart wearables (e.g., smart watches and/or smart glasses), smart speakers, smart televisions, laptops, desktops, smart appliances (e.g., smart refrigerator, smart washer, smart dryer, and/or smart dispenser), virtual assistant devices (e.g., smart home panels, room based assistants, and/or other assistant devices), tablets, and/or other computing devices. The plurality of computing devices 222 can include mobile computing devices and/or fixed computing devices. In some implementations, the plurality of computing devices 222 can include devices proximate to the user, devices registered with a user's mobile device, devices registered to a user's profile, devices connected to a particular internet hub, devices registered to a particular assistant device, and/or devices with other correlations.

The response generation system 200 can process the input data 212 and/or the environment data 214 to generate a prompt 216. The prompt 216 can include information associated with the query and the plurality of computing devices. The prompt 216 may include the query and an indicator of one or more candidate computing devices to provide the output with. The prompt 216 may be generated by querying a prompt library 224 to determine a prompt template based on the environment data 214. Querying the prompt library 224 can include determining a prompt template associated with an environment configuration associated with the environment of the user. Alternatively and/or additionally, querying the prompt library 224 can include generating an embedding based on the environment data 214 and then determining a prompt template associated with the embedding based on a nearest neighbor search. The prompt template can then be filled-in based on the input data 212. Alternatively and/or additionally, the prompt 216 may be generated by processing the input data 212 and the environment data 214 with a prompt generation model. The prompt generation model can include a machine-learned model, which may include a generative model (e.g., an autoregressive language model, a diffusion model, a vision language model, and/or other generative models). The prompt 216 may include text data, image data, audio data, latent encoding data, multimodal data, embedding data, and/or other data. The prompt 216 may include a hard prompt (e.g., a text string and/or other data inputs) and/or a soft prompt (e.g., a set of learned parameters). In some implementations, the prompt 216 can be a zero shot prompt and/or a few shot prompt. The prompt 216 may separate the user request into a plurality of tasks, which can be provided as a plurality of prompts.

A generative model 218 can then process the prompt 216 to generate a model-generated output 220. The generative model 218 can include a generative language model (e.g., a large language model, vision language model, and/or other language models), an image generation model (e.g., a text-to-image generation model), and/or other generative models. The generative model 218 may include a transformer model, a convolution model, a feed-forward model, a recurrent model, a self-attention model, and/or other models.

In some implementations, the generative model 218 can be communicatively connected to one or more processing engines (e.g., a search engine, a rendering engine, and/or other engines) and/or one or more machine-learned models (e.g., a classification model, an augmentation model, a segmentation model, a detection model, an embedding model, and/or other models). For example, the generative model 218 can communicate back-and-forth with a search engine 226 to obtain search results based on the input data 212, the environment data 214, and/or an inference. The search engine 226 may output search results that may then be processed by the generative model 218 to generate a summary of the search results and/or determine a response to the query based on information from the search results, which can then be utilized to generate the model-generated output 220. The model-generated output 220 can include text data, image data, audio data, latent encoding data, multimodal data, and/or other data.

The model-generated output 220 can include a predicted response to the query of the input data 212. The model-generated output 220 can be a novel generated output that includes a plurality of predicted features (e.g., predicted text characters, predicted audio signals, predicted pixels, etc.). The model-generated output 220 can be generated to be provided by a particular computing device of the plurality of computing devices. For example, the model-generated output 220 may be generated to be of a particular size, quality, and/or content type based on a preferred computing device (with particular capabilities) as determined based on the prompt and/or the generative model 218 processing.

The generative model 218 may process the prompt 216 to generate output device instructions 230. The output device instructions 230 can include instructions for transmitting the model-generated output 220 to a particular computing device 228 of the plurality of computing devices 222. The output device instructions 230 may include an application programming interface call, a registration file, and/or instructions for the particular computing device 228.

The model-generated output 220 can then be provided to the particular computing device within the environment based on the output device instructions 230 and/or with the output device instructions 230. Providing the model-generated output 220 to the particular computing device can include transmitting the data, which may include generating an application programming interface call with the generative model and performing the API call with one or more application programming interfaces. The particular computing device can then provide the model-generated output 220 to the user (e.g., via a visual display, a speaker, and/or other output components of the particular computing device).

Figure 3:
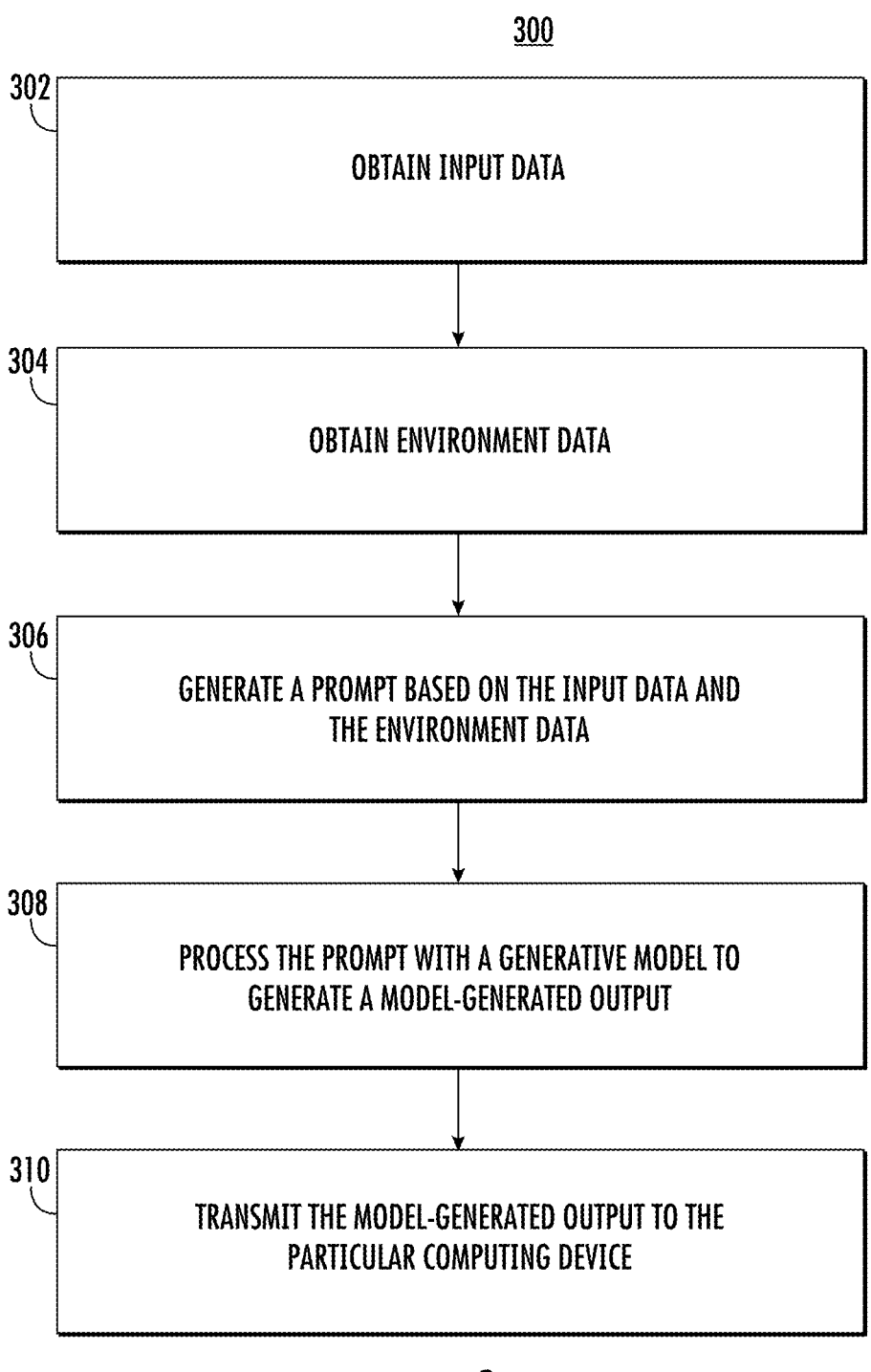
FIG. 3 depicts a flow chart diagram of an example method to perform response generation according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain input data. The input data can include a query associated with a particular user. The input data can include text data, audio data, image data, gesture data, latent encoding data, multimodal data, and/or other data. The input data can be obtained from and/or generated with one or more computing devices in an environment. The input data may include a prompt for a generative model. In some implementations, the input data may be descriptive of a question associated with one or more topics. The question may be associated with content viewed on one or more computing devices and/or features in the environment.

At 304, the computing system can obtain environment data. The environment data can be descriptive of a plurality of computing devices in an environment of the user. The plurality of computing devices can be associated with a plurality of different output components. In some implementations, the plurality of computing devices can be located proximate to each of the other computing devices within the plurality of computing devices. The plurality of computing devices may be communicatively connected over a network. In some implementations, the environment data can be descriptive of specifications for the plurality of computing devices. For example, the environment data can indicate components of the computing device that may include input components and/or output components. Additionally and/or alternatively, the environment data may include information descriptive of input capabilities and/or output capability for the plurality of different computing devices.

At 306, the computing system can generate a prompt based on the input data and the environment data. The prompt can include data descriptive of the query and device information associated with at least a subset of the plurality of computing devices. The prompt may include text data, image data, audio data, embedding data, statistical data, graphical representation data, latent encoding data, semantic data, multimodal data, and/or other data. The prompt may be generated with a machine-learned model, based on a deterministic function, heuristics, and/or a hybrid approach. The prompt may be generated by querying a prompt template library based on the environment data and filling out the selected prompt template based on the input data.

In some implementations, generating the prompt based on the input data and the environment data can include determining an environment-specific device configuration based on the environment data, obtaining a prompt template from a prompt library based on the environment-specific device configuration, and augmenting the prompt template based on the input data to generate the prompt. The environment-specific device configuration can be descriptive of respective output types and respective output quality for the plurality of computing devices. The prompt library can include a plurality of different prompt templates associated with a plurality of different device configurations.

At 308, the computing system can process the prompt with a generative model to generate a model-generated output. The model-generated output can include a response to the query. In some implementations, the model-generated output can be generated to be provided with a particular computing device of the plurality of computing devices. The model-generated output can be generated to be provided with a particular output component of the plurality of different output components. The generative model can generate output device instructions. The output device instructions can be descriptive of a particular computing device of the plurality of computing devices to provide the model-generated output. The particular computing device can be associated with the particular output component. For example, the model-generated output may be generated to be provided to a user via the respective output components of the particular computing device (e.g., the speakers of a smart surround system and/or the display screen of a smart television).

In some implementations, the generative model can be communicatively connected with a search engine via an application programming interface. Processing the prompt with the generative model to generate the model-generated output can include generating an application programming interface call based on the prompt, determining a plurality of search results with the search engine based on the application programming interface call, and processing the plurality of search results with the generative model to generate the model-generated output.

At 310, the computing system can transmit the model-generated output to the particular computing device. The model-generated output can be transmitted to the particular computing device based on the output device instructions. Transmitting the model-generated output to the particular computing device can include performing an application programming interface call generated by the generative model. The model-generated output may be transmitted to a virtual assistant device in the user environment, and the virtual assistant device may then control the particular computing device to provide the model-generated output to the particular user.

In some implementations, the plurality of computing devices can be connected via a cloud computing system. Each of the plurality of computing devices can be registered with a platform of the cloud computing system. The environment data can be obtained with the cloud computing system. The model-generated output can be transmitted via the cloud computing system. Alternatively and/or additionally, the plurality of computing devices can be communicatively connected over a local network. A particular computing device of the plurality of computing devices may facilitate input data obtainment and model-generated output transmission.

In some implementations, processing the prompt with the generative model to generate the model-generated output can include generating a plurality of model outputs. The plurality of model outputs can include a plurality of candidate responses. Additionally and/or alternatively, transmitting the model-generated output to the particular computing device can include transmitting a first model output of the plurality of model outputs to a first computing device of the plurality of computing devices and transmitting a second model output of the plurality of model outputs to a second computing device of the plurality of computing devices. The first model output can include visual data for display via a visual display. The second model output can include audio data for playback via a speaker component. In some implementations, the first computing device can include a smart television. Additionally and/or alternatively, the second computing device can include a smart speaker.

Figure 4:
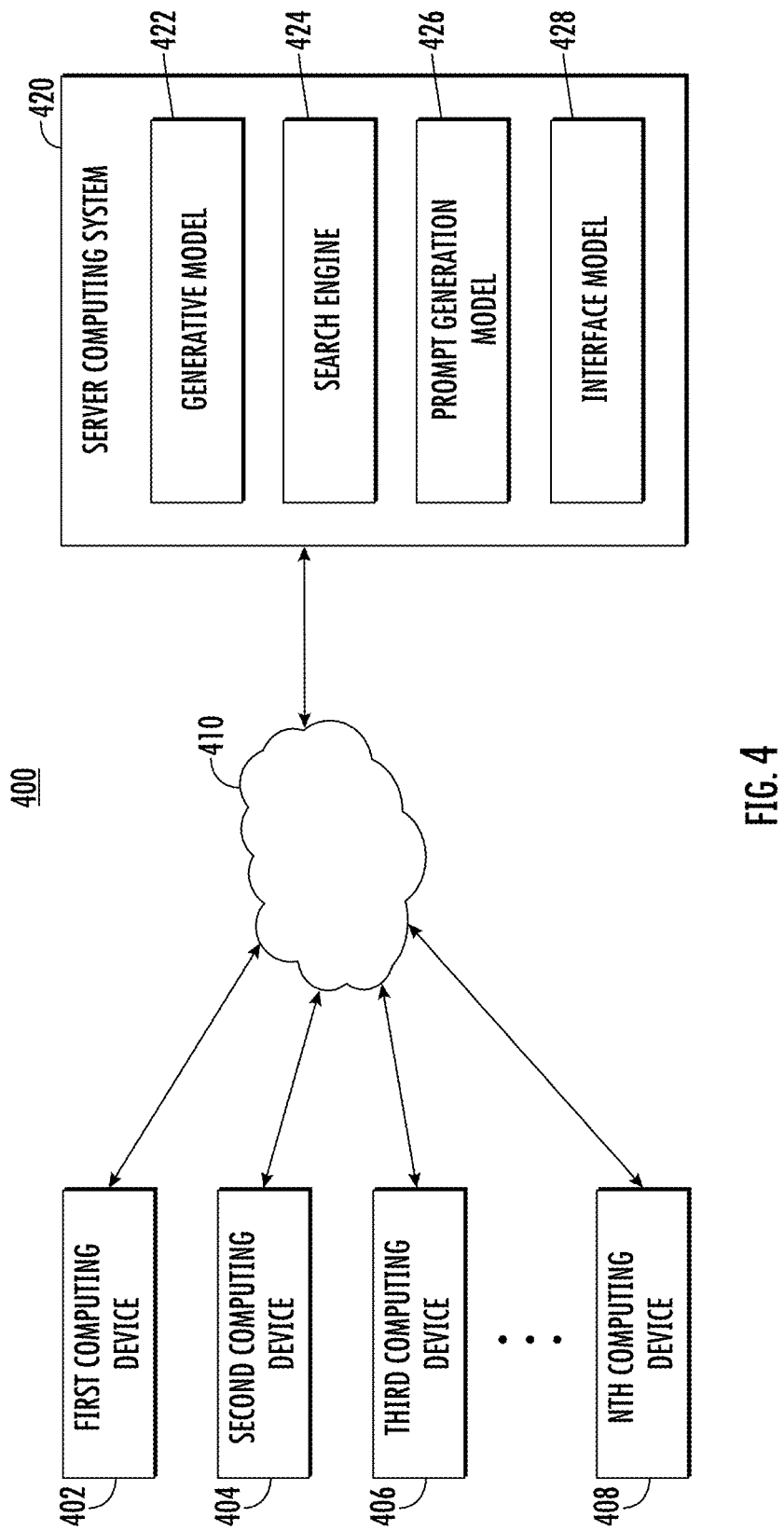
FIG. 4 depicts a block diagram of an example multi-device management system according to example embodiments of the present disclosure.

FIG. 4 depicts a block diagram of an example multi-device management system 400 according to example embodiments of the present disclosure. In particular, the multi-device management system 400 can include a computing system that includes a plurality of user computing devices and a server computing system 420. The plurality of user computing devices and the server computing system 420 can be communicatively connected via a network 410.

The plurality of user computing devices can include a first computing device 402, a second computing device 404, a third computing device 406, and/or an nth computing device 408. The plurality of user computing devices can include a plurality of different computing devices, which may have different input, processing, and/or output capabilities. For example, the first computing device 402 can include a smartphone with image sensors, audio sensors, touch sensors, motion sensors, speakers, visual displays, haptic components, and/or lights. The second computing device 404 can include a smart wearable (e.g., a smart watch), which may include biometric sensors, motion sensors, touch sensors, a visual display, and/or haptic components. The third computing device 406 can include a smart speaker, which may include high quality speakers and/or a Bluetooth transmitter. The nth computing device 408 can include a smart television, which may include an infrared sensor receiver, a transmitter-receiver, speakers, a visual display, and/or a plurality of input ports. The plurality of user computing devices can be connected to the network 410 via ethernet, WiFi, and/or Bluetooth connection to a companion device.

The plurality of user computing devices may be associated with an environment based on device registration, location, and/or proximity. Environment data may be generated based on the plurality of user computing devices, which may include obtaining signals from the plurality of user computing devices.

The server computing system 420 can obtain input data and/or environment data from the plurality of user computing devices via the network 410. The server computing system 420 can include a plurality of processing services for processing the input data and/or the environment data. For example, the server computing system 420 may include one or more generative models 422, one or more search engines 424, one or more prompt generation models 426, one or more interface models 428, and/or one or more other models. The one or more generative models 422 can be configured, trained, and/or tuned to process prompts associated with the input data and/or the environment data to generate a model-generated output that is responsive to the input data and configured to be of a particular content type based on the environment data. The one or more search engines 424 can be communicatively connected to obtain search results that may be utilized for understanding the input data and/or environment data and/or for responding to the input data and/or environment data. The one or more prompt generation models 426 can be configured, trained, and/or tuned to process the input data and/or the environment data to generate a prompt for the one or more generative models 422. The one or more interface models 428 can be configured, trained, and/or tuned to process the environment data associated with the plurality of user computing devices and generate a plurality of respective interfaces for the plurality of user computing devices. The plurality of respective interfaces can be generated based on the input and/or output capabilities of the devices within the environment.

Figure 5:
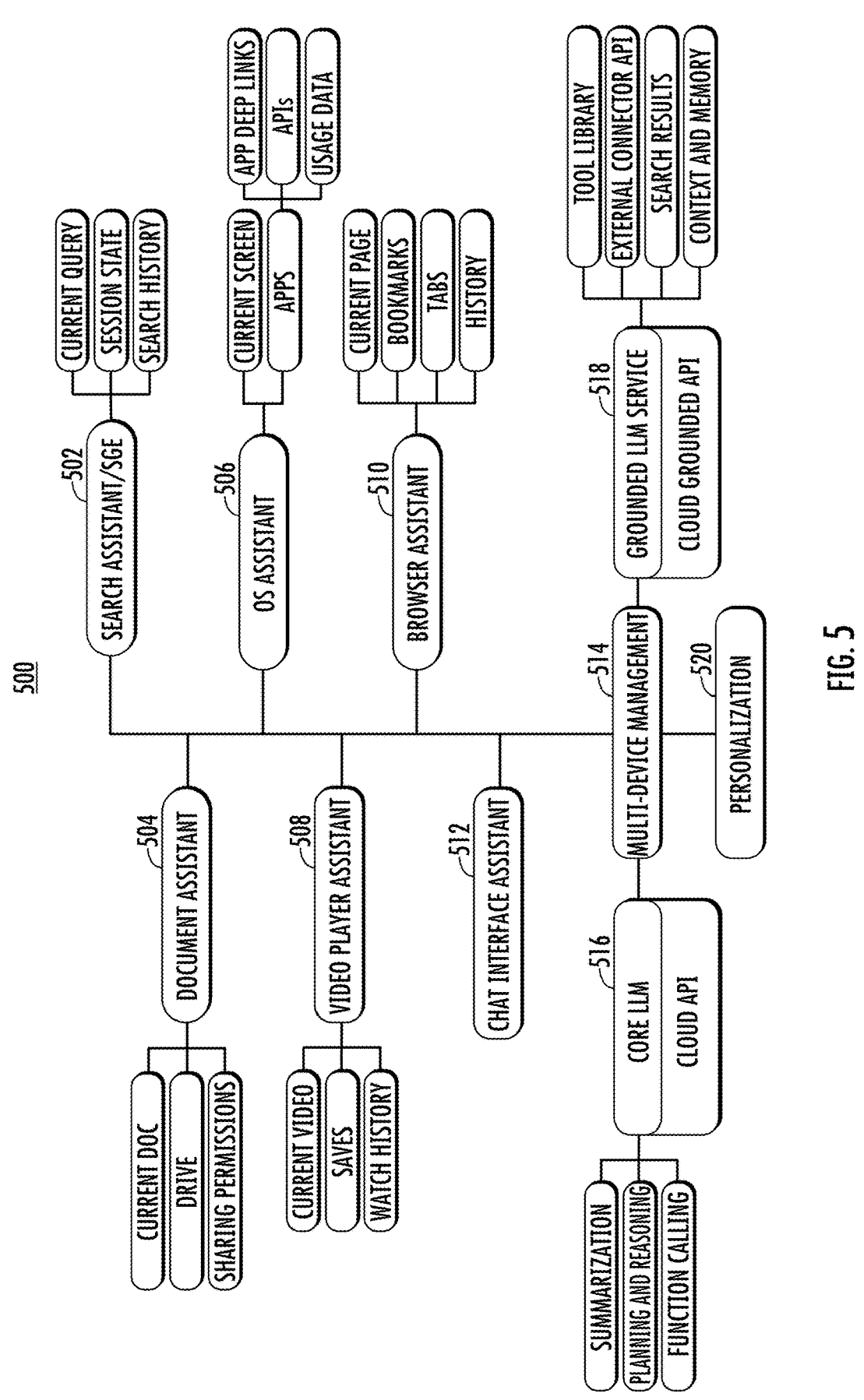
FIG. 5 depicts a block diagram of an example environment personalization system according to example embodiments of the present disclosure.

FIG. 5 depicts a block diagram of an example environment personalization system 500 according to example embodiments of the present disclosure. In particular, the environment personalization system 500 can leverage information from a plurality of applications and/or platforms to provide personalized responses and/or personalized experiences. For example, data from search assistants 502, document assistants 504, operating system assistants 506, video player assistants 508, browser assistants 510, and/or chat interface assistants 512 to determine a user context and/or generate a query and/or suggestion.

The search assistant 502 can be associated with a search application (and/or platform). The search assistant 502 can obtain a current query, a session state, a search history, trend data, and/or other search data.

The document assistant 504 can be associated with one or more document applications. The document assistant 504 can obtain data associated with a current document being viewed and/or edited, drive data (e.g., stored document information), sharing permissions data, and/or other document data.

The operating system assistant 506 can be associated with an operating system for one or more computing devices. The operating system assistant 506 can obtain data associated with content currently provided for display, application data (e.g., app deep links, application programming interfaces (APIs), and/or usage data), and/or other operating data.

The video player assistant 508 can be associated with a video player application (and/or platform). The video player assistant 508 can be utilized to obtain video data for a currently displayed video, video saves, watch history, followed media providers, subscriptions, comment history, and/or other video player data.

The browser assistant 510 can be associated with a browser application. The browser assistant 510 can obtain data associated with a current page, bookmark data, tabs data, browsing history data, and/or other browser data.

The chat interface assistant 512 can be associated with one or more chat bots. The chat interface assistant can obtain session history data, response history, input history, topics, links, and/or other chatbot data.

The multi-device management system 514 can obtain the data from the plurality of applications and/or platforms and provide the data to one or more other systems, which may include a core model 516 a grounded service model 518, and/or a personalization model 520.

For example, the core model 516 can be leveraged for summarization, planning and reasoning, and/or function calling. The grounded service model 518 can be leveraged for utilizing a tool library, utilizing an external connector application programming interface (API), accessing search results, and/or accessing context and/or memory. The core model 516 and/or the grounded service model 518 may interact with one or more other models and/or services via one or more cloud APIs. The outputs of the core model 516 and/or the grounded service model 518 may be provided back to the multi-device management system 514 to then be provided to the personalization model 520.

The personalization model 520 may process data to generate a personalized output that may include a predicted prompt (and/or a suggested prompt). The personalized output may be a prompt response augmented based on user data associated with user preferences, interactions, and/or devices.

Figure 6A:
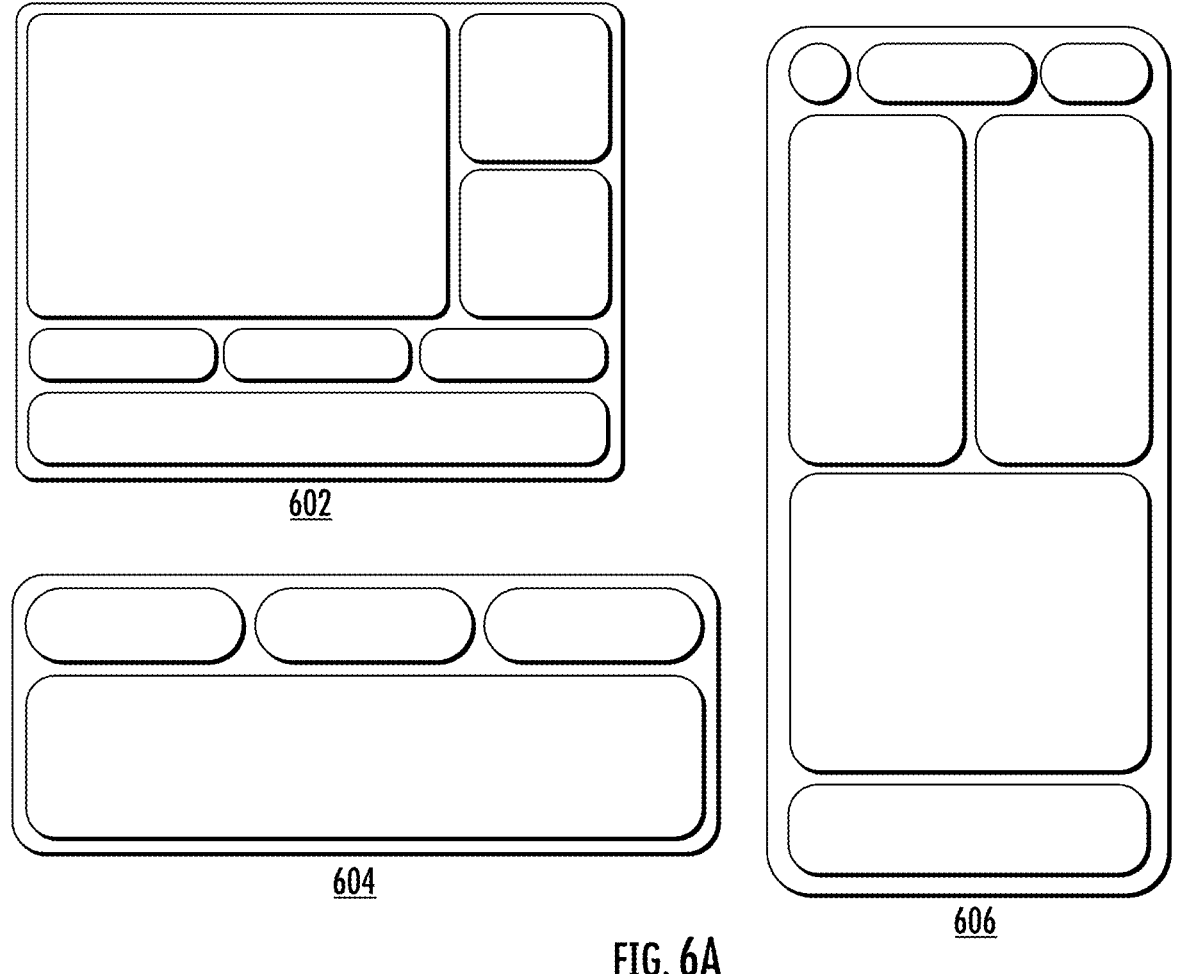
FIG. 6A depicts illustrations of example interfaces according to example embodiments of the present disclosure.

FIG. 6A depicts illustrations of example interfaces according to example embodiments of the present disclosure. In particular, the systems and methods disclosed herein can be leveraged to generate and process environment data associated with computing devices to generate a plurality of respective interfaces for the plurality of computing devices within the environment. The plurality of respective interfaces can account for the plurality of other computing devices and may obfuscate and/or blend with the pre-existing interface. FIG. 6A depicts three example interfaces that may be associated with different devices in the environment and/or may be associated with different environments.

For example, the first interface 602 may be associated with a first computing device (e.g., a mobile device) within the environment, the second interface 604 may be associated with a second computing device (e.g., a smart watch) within the environment, and the third interface 606 may be associated with a third computing device (e.g., a smart fridge) within the environment. Alternatively and/or additionally, a same computing device may have different interfaces based on being in different environments and/or based on different user contexts.

Figure 6B:
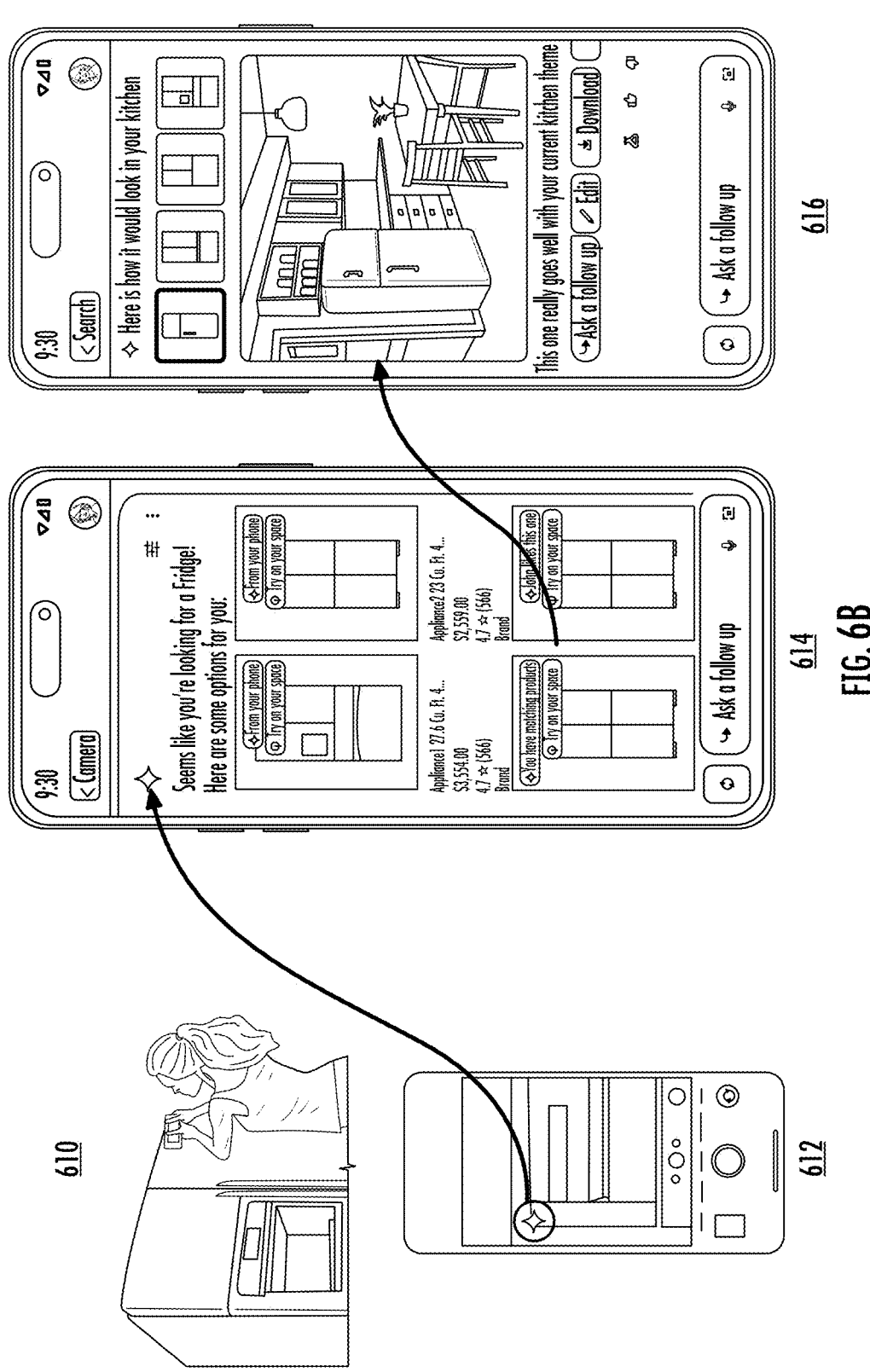
FIG. 6B depicts an illustration of an example image capture entry point according to example embodiments of the present disclosure.

FIG. 6B depicts an illustration of an example image capture entry point according to example embodiments of the present disclosure. In particular, one entry point for the search and/or assistant interface that leverages multi-device inputs and/or outputs may be provided via a user interface element that is provided based on context.

For example, a user may be capturing an image 610 (e.g., capturing an image of a fridge). The image may be processed to determine (and/or identify) the object in the image (e.g., classify the object as a Brand X Model Y fridge). A selectable user interface element can then be provided in a viewfinder 612. The image and/or the identification can then be processed to generate a response that may include search results 614 associated with similar objects to the identified objects. Other options may also be provided for interacting with the response. The other options may include an augmented-reality experience, which may include rendering the object into an image of the user's home 616.

Figure 6C:
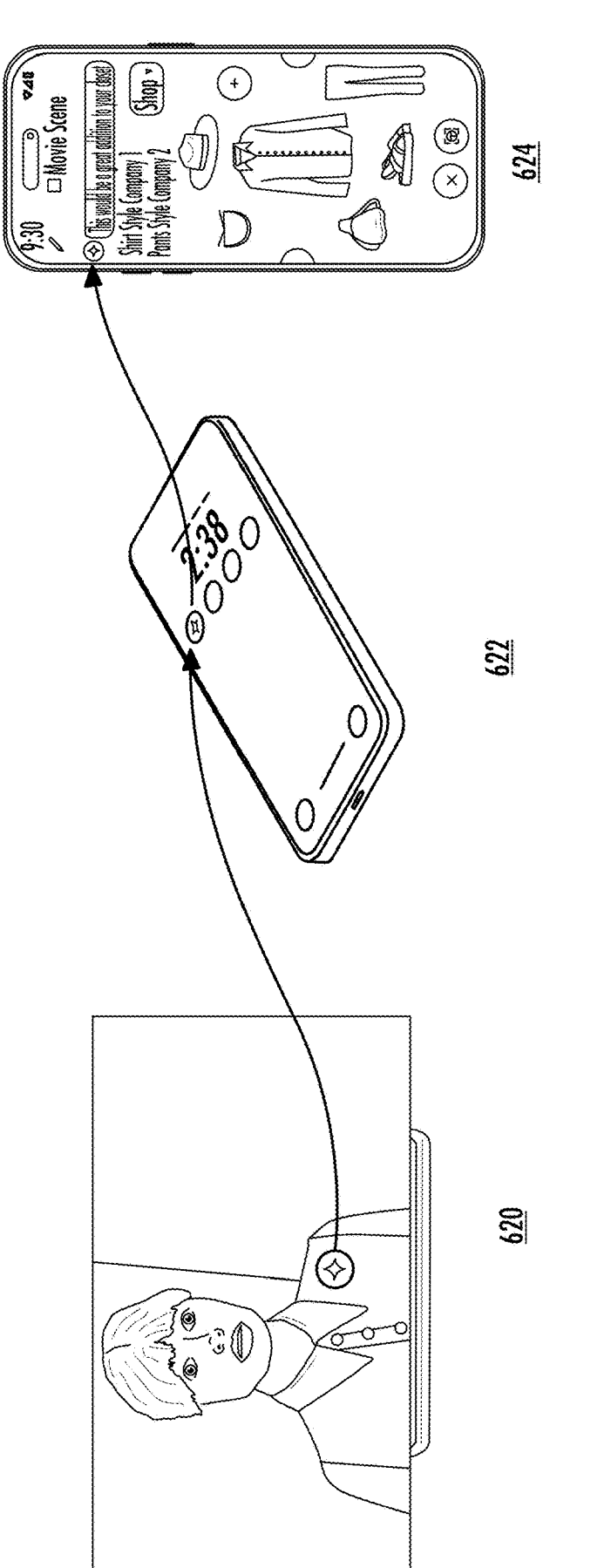
FIG. 6C depicts an illustration of an example smart television entry point according to example embodiments of the present disclosure.

FIG. 6C depicts an illustration of an example smart television entry point according to example embodiments of the present disclosure. In particular, one entry point can include providing a suggested search entry point indicator on one device, that may be interacted with on another device.

For example, content provided for display on a first computing device 620 (e.g., a smart TV) can be determined to include features a user may have interest in searching. Therefore, a suggested entry point user interface element may be rendered over the content. A user may then select the selectable user interface element 622 on a second computing device (e.g., a mobile computing device) to view a model-generated output 624. The model-generated output can be provided via the first computing device 620, the second computing device, and/or a third computing device. The model-generated output 624 may include search results, a generative model output, one or more renderings, one or more suggestions, and/or other options.

FIG. 6D depicts an illustration of an example calendar interface according to example embodiments of the present disclosure. In particular, FIG. 6D depicts an example calendar interface that includes a search window that can be conditioned based on the calendar data. For example, the search window can include a text entry field and two suggested actions. The suggested actions can include finding a room for a meeting 630 and/or suggesting time to block off for focus time 632. The suggestions may be generated based on information from a plurality of applications and/or a plurality of computing devices. The search window may be provided on the device that has the calendar application open and/or may be provided on another device.

Figure 6E:
FIG. 6E depicts an illustration of an example video conferencing interface according to example embodiments of the present disclosure.

FIG. 6E depicts an illustration of an example video conferencing interface 634 according to example embodiments of the present disclosure. In particular, FIG. 6E depicts an example video conferencing interface 634 that includes a search window 636 that can be conditioned based on the meeting data. For example, the search window 636 can include a text entry field and one or more suggested actions. The suggested actions can include taking notes on the meeting (e.g., transcribing the meeting and/or opening a notes application), setting up reminders, rescheduling the meeting, and/or obtaining notes from similar meetings. The suggestions may be generated based on information from a plurality of applications and/or a plurality of computing devices. The search window 636 may be provided on the device that has the video conferencing application open and/or may be provided on another device.

Figure 6F:
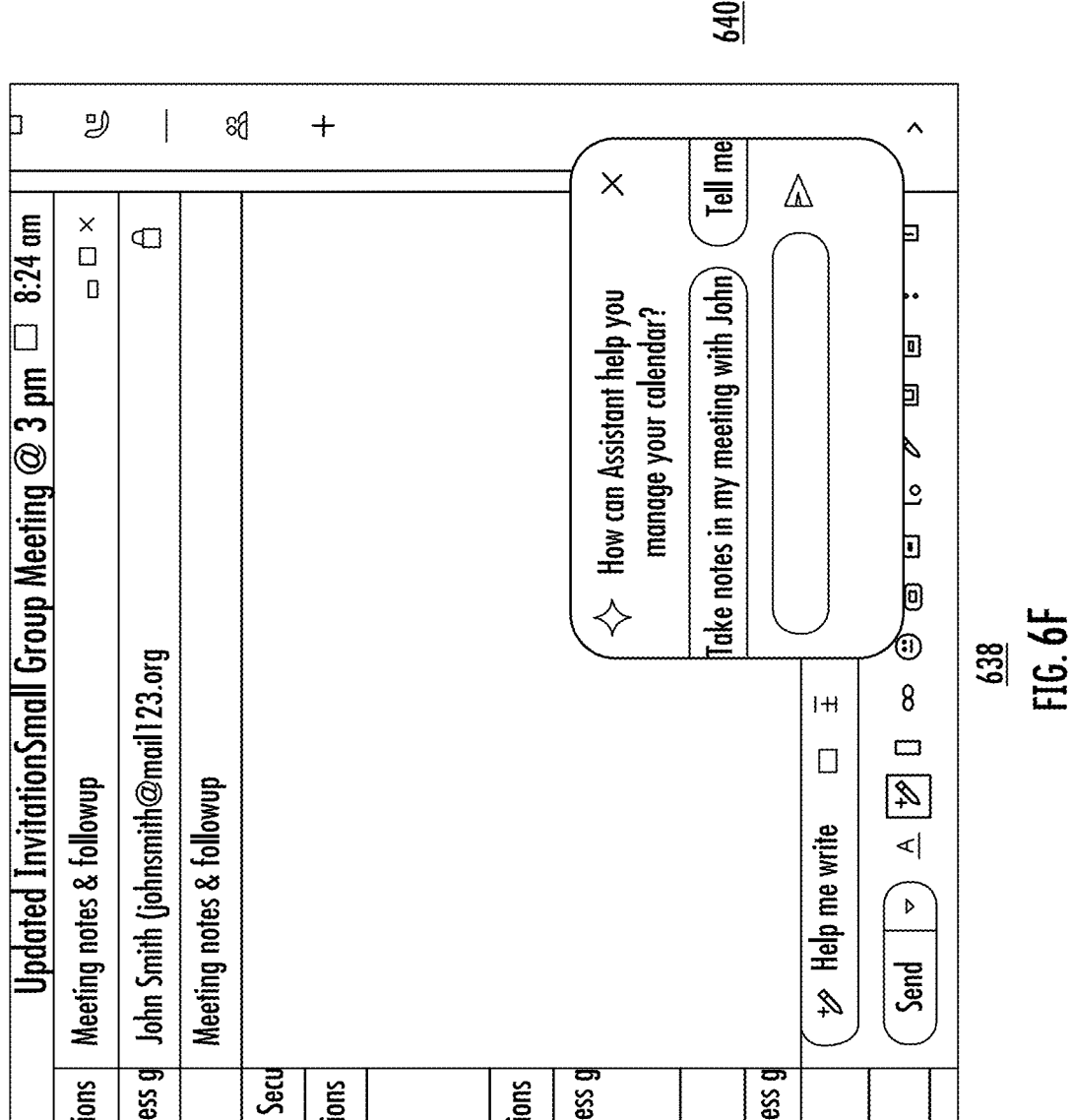
FIG. 6F depicts an illustration of an example email interface according to example embodiments of the present disclosure.

FIG. 6F depicts an illustration of an example email interface according to example embodiments of the present disclosure. In particular, FIG. 6F depicts an example email interface 638 that includes a search window 640 that can be conditioned based on the email data and/or meeting data. For example, the search window 640 can include a text entry field and one or more suggested actions. The suggested actions can include summarizing meeting notes and/or the transcript, scheduling another meeting, obtaining information on topics from the meeting, drafting a follow-up email based on the context associated with the meeting notes, and/or drafting an email based on the email data and/or meeting data. The suggestions may be generated based on information from a plurality of applications and/or a plurality of computing devices. The search window 640 may be provided on the device that has the email application open and/or may be provided on another device.

Figure 6G:
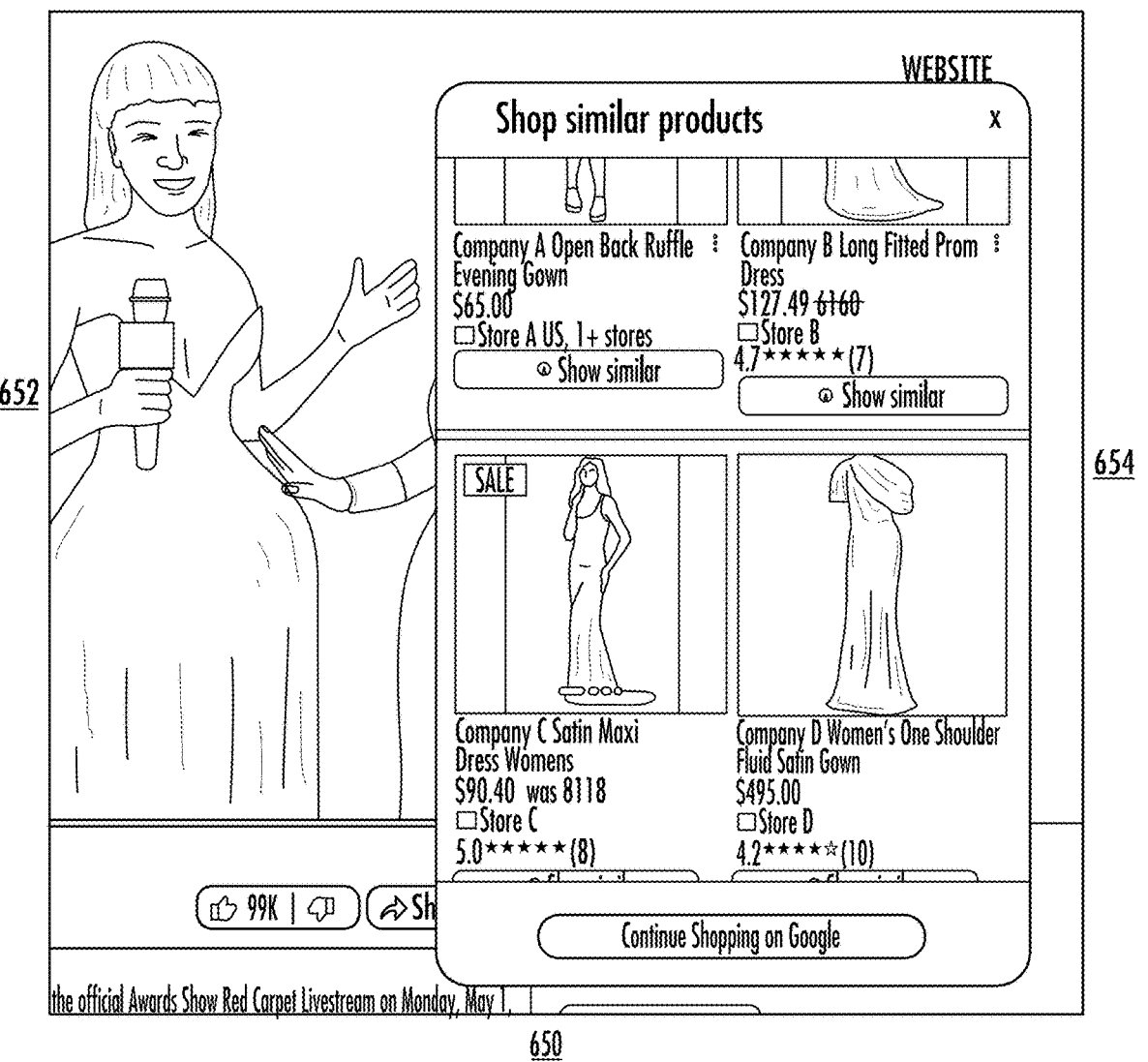
FIG. 6G depicts an illustration of an example video player interface according to example embodiments of the present disclosure.

FIG. 6G depicts an illustration of an example video player interface according to example embodiments of the present disclosure. In particular, FIG. 6G depicts an example video player interface 650 that includes a search window 654 that can be conditioned based on the video data and/or viewing history data. For example, the search window 654 can include a text entry field and one or more suggested actions. The suggested actions can include obtaining product listings for similar products depicted in a displayed video 652, summarizing the video, obtaining entity labels for the displayed video, finding similar videos, and/or obtaining additional information associated with the displayed video 652. For example, the user may request further information on a dress depicted in the displayed video 652. One or more frames can be segmented from the video and searched, which may include frame cropping. Alternatively and/or additionally, entity labels associated with the depicted frame may be obtained and searched. The search results may be provided for display in the search window 654 superimposed over the displayed video. The search results can include product listings, web links, and/or other data. The suggestions may be generated based on information from a plurality of applications and/or a plurality of computing devices. The search window 654 may be provided on the device that has the video player application open and/or may be provided on another device.

Figure 7:
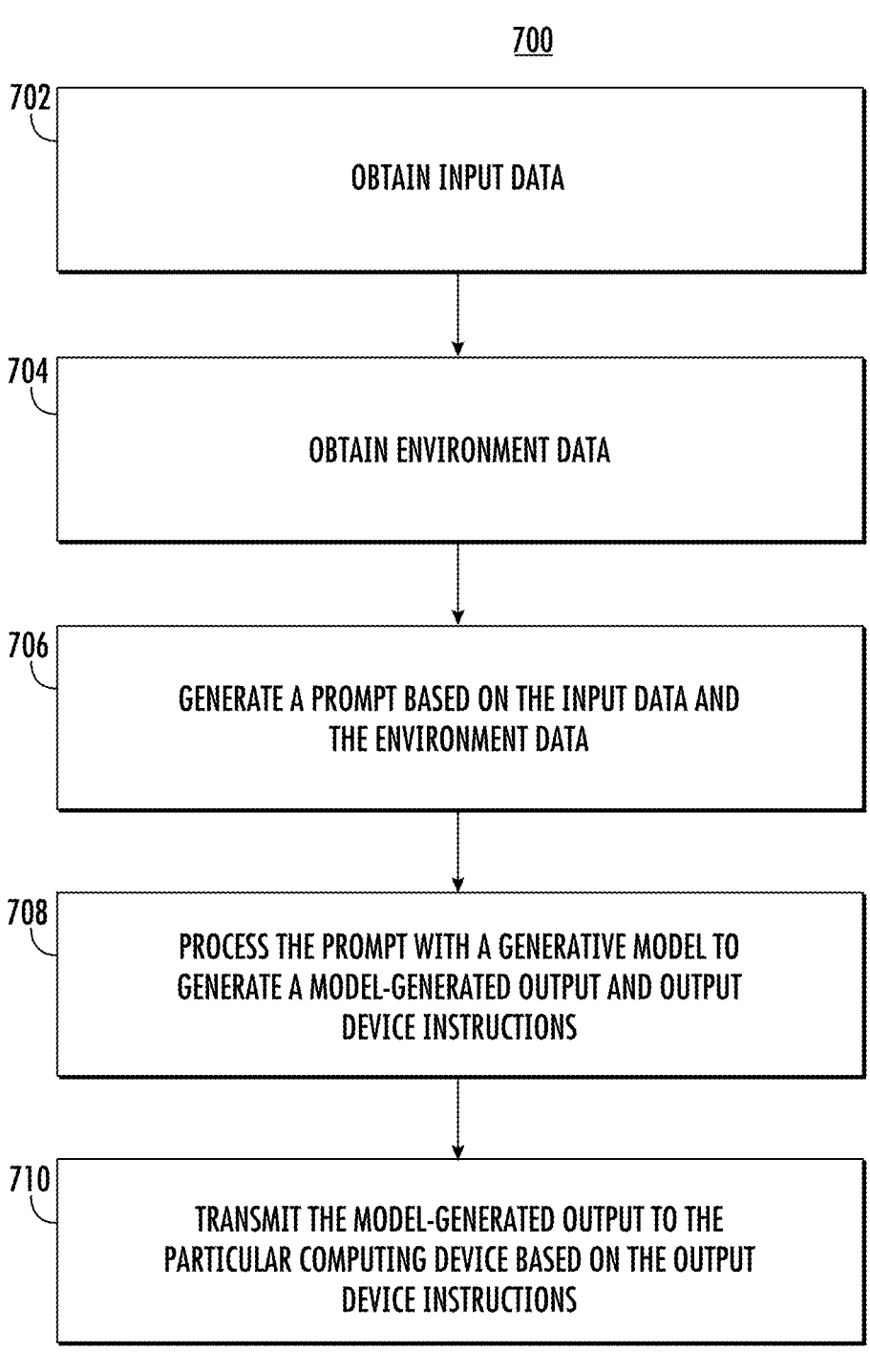
FIG. 7 depicts a flow chart diagram of an example method to perform output generation and routing according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain input data. The input data can include a query associated with a particular user. The query can include a question associated with one or more topics, and the query may request a response to the question. The input data may include a voice command obtained via a microphone, a text string input via a graphical keyboard, and/or a gesture obtained via a camera, inertial measurement units, and/or touch sensors. In some implementations, the input data may include data descriptive of inputs obtained from multiple computing devices within the environment (e.g., a voice command obtained via a microphone on a smartphone, a gesture via the touch sensors of a smart watch, image data from a smart refrigerator, and/or a watch history obtained from a smart television).

At 704, the computing system can obtain environment data. The environment data can be descriptive of a plurality of computing devices in an environment of the user. The plurality of computing devices can be associated with a plurality of different output components. The plurality of different output components can be associated with a plurality of respective output capabilities associated with the plurality of computing devices. In some implementations, each of the plurality of respective output capabilities can be descriptive of an output type and quality available via the respective computing device. The plurality of output components can include a speaker associated with a first device and a visual display associated with a second device. The environment data can include registration data associated with computing devices registered with the environment, a WiFi router, a virtual assistant device, a user computing device, and/or a user profile. In some implementations, the environment data can include an output hierarchy for a plurality of candidate output types, which may include a hierarchical representation of performance capabilities of the plurality of computing devices for a plurality of different output types (e.g., visual display, audio output, haptic feedback, etc.).

At 706, the computing system can generate a prompt based on the input data and the environment data. The prompt can include data descriptive of the query and device information associated with at least a subset of the plurality of computing devices. The prompt may be generated by processing the input data and the environment data with a prompt generation model. The prompt generation model may include a language model (e.g., a generative language model (e.g., a large language model)). The prompt generation model may be trained and/or tuned to generate prompts based on understanding an intent of the query and determining an output type associated with the intent and/or available based on the environment data. The prompt generation model may generate a prompt embedding to condition output generation of the generative model.

In some implementations, the computing system can determine the particular output component is associated with an intent of the query. The prompt can be generated based on the particular output component being associated with the intent of the query (e.g., a request for a song may be associated with a speaker output component, while a request for playing a video may be associated with a visual display of a television).

Additionally and/or alternatively, the computing system can determine, based on the environment data, an output hierarchy based on specification information for the plurality of different output components. The prompt can be generated based on the output hierarchy and the query. For example, the prompt may include text and/or an embedding that conditions output generation based on the output capabilities of the computing devices within the environment.

At 708, the computing system can process the prompt with a generative model to generate a model-generated output and output device instructions. The model-generated output can include a response to the query. In some implementations, the model-generated output can be generated to be provided with a particular output component of the plurality of different output components. The output device instructions can be descriptive of a particular computing device of the plurality of computing devices to provide the model-generated output. The particular computing device can be associated with the particular output component. In some implementations, the output device instructions can include an application programming interface call to transmit the model-generated output to the particular computing device.

At 710, the computing system can transmit the model-generated output to the particular computing device based on the output device instructions. In some implementations, the transmission may be performed via signal transmission over a network. Alternatively and/or additionally, a notification may be provided to the input computing device indicating an output configured for another device is available, and the user may then interact with the notification before the model-generated output is transmitted to the particular computing device. In some implementations, the generative model may generate a plurality of model-generated outputs, and the computing system may transmit the plurality of model-generated outputs to a plurality of different computing devices within the environment (e.g., an slideshow may be transmitted to a smart television for playback, a text document may be transmitted to an eReader or personal computing device (e.g., a smartphone or tablet), an audio file may be transmitted to a smart speaker, and/or a scheduled color and brightness instruction set may be transmitted to an RGB smart light set up).

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain environment data. The environment data can be descriptive of a plurality of computing devices within an environment associated with a particular user. The environment data may be descriptive of the specification information for the plurality of computing devices. In some implementations, the plurality of computing devices may be determined based on registration of the device with a particular network, registration of the device with a particular user device, registration of the device with a particular user profile, proximity to a user device, and/or based on signal exchange between the device and a user device. The user device may be a smartphone, a tablet, a smart watch, smart glasses, and/or other computing devices.

At 804, the computing system can process the environment data to determine a plurality of respective input capabilities and a plurality of respective output capabilities associated with the plurality of computing devices. The plurality of respective input capabilities can be associated with candidate input types associated with the plurality of computing devices. In some implementations, the plurality of respective output capabilities can be associated with candidate output types associated with the plurality of computing devices. The plurality of input capabilities and/or the plurality of output capabilities may be determined based on specification information (and/or component information) associated with the plurality of computing devices. In some implementations, the plurality of input capabilities and/or the plurality of output capabilities may be determined with a machine-learned model, based on one or more searches, based on heuristics, and/or based on one or more other determination techniques. The plurality of input capabilities may be descriptive of a type of input available along with the range of quality associated with the input type obtainment and/or generation (e.g., decibel range of microphone and/or resolution of a camera). The plurality of output capabilities may be descriptive of a type of output available along with the range of quality associated with providing an output of that output type (e.g., the quality of audio (e.g., volume range, frequency range, etc.)).

At 806, the computing system can generate a plurality of respective interfaces for the plurality of computing devices based on the plurality of respective input capabilities and the plurality of respective output capabilities. The plurality of respective interfaces can be specialized for the plurality of computing devices based on the plurality of computing devices based on the plurality of respective input capabilities and the plurality of respective output capabilities. In some implementations, the plurality of respective interfaces can include a plurality of device indicators that indicate the plurality of computing devices within the environment associated with the particular user. The plurality of computing devices can be configured as a user-specific device ecosystem that are communicatively connected for receiving inputs and providing outputs. Each of the plurality of respective interfaces can be configured to receive particular input types and provide particular output types based on respective input capabilities and respective output capabilities for the particular computing device of the plurality of computing devices.

At 808, the computing system can provide the plurality of respective interfaces to the plurality of computing devices. The plurality of respective interfaces may be transmitted to the plurality of computing devices in response to the interface generation and/or in response to a user interacting with the particular computing device. The plurality of respective interfaces may be stored by a server computing system and may be provided to the computing devices upon use. Alternatively and/or additionally, the respective interface for a respective computing device may be downloaded locally and may be provided during offline and online states.

In some implementations, the computing system can obtain a user input via a first interface of a first computing device of the plurality of computing devices. The computing system can process the user input with a search engine to determine a plurality of search results, process the plurality of search results with a generative model to generate a model output, and provide the model output for display via a second interface of a second computing device of the plurality of computing devices.

Users can increasingly own multiple devices which may or may not share operating systems, apps, and/or platforms. Foundational models (e.g., large foundational models, which may include a generative model) can be utilized as the main technology through which users interact with their devices. The system can provide a broad set of new experiences enabled by these foundational models being able to condition both their inputs and outputs on all the devices in an integrated way.

The multi-device framework that leverages the foundational model can be utilized for a plurality of different companion tasks, which may include output conditioning, interface generation, input obtainment facilitation, and/or other tasks.

For example, the multi-device framework can be utilized for an ambient agent companion with fluid interaction mechanisms depending on device and surface. A user may own several devices that may possibly use disjointed ecosystems with an ambient LLM companion present. The agent (e.g., a computing system that includes a multi-device framework) can include a foundational model (e.g., a foundational model with a generative model and/or a prompt generation model) that adapts the input/output interaction models based on the specifics of the device. For example, speakers may have voice only interfaces as their primary interaction models, devices with screens without touch may have a hybrid text/voice interface, and/or phones and/or smart wearables (e.g., smart watches, smart jackets, and/or smart glasses) may have an ad-hoc generated user interface based on their form factor.

The interfaces can be generated to blend with the surface present (e.g., the user interface may be minimized into one or more app elements (e.g., the agent interface may turn into text and/or animation within the specific app interface)). The generated interfaces may have multi-device/surface awareness elements which may highlight, based on the proximity of the user to devices, which of the devices the ambient companion is actively listening to and/or monitoring. When the interaction with the companion on one device requires context from other devices and/or needs to perform the action on the other devices, the user interface may include a user interface element to showcase that these other devices are being utilized and/or taken into account.

Additionally and/or alternatively, the systems and methods may condition the ambient companion model output on the device form factors and characteristics. For example, a user in an environment with a smart television and a smart home device (e.g., a virtual assistant device) may provide an input (e.g., a via voice command) that issues a query (e.g., a query similar to "what movies were nominated for the Oscars for their best songs?"). An LLM-enabled search engine/assistant/companion may obtain an additional input to the query in which the additional input may be descriptive of the device specifics (e.g., an input that specifies the environment includes a screen and speaker together with their specific parameters). The higher quality of the smart speaker may be provided as part of the LLM prompt. Based on the prompt, the generative model (e.g., the LLM) may generate a response which targets the smart speaker (e.g., "I'll list out the movies and play samples of their award-winning soundtracks on your speaker"). Meanwhile another user who issues the same query, may be in an environment with the same smart television, but a lower-quality speaker, which may therefore receive an answer in the form of a visual display via the smart television (e.g., the response may include "I'll play parts of the trailers for those movies on your TV. You'll hear fragments of their award winning sound-tracks in these.").

In some implementations, the systems and methods can obtain and/or determine availability and context of nearby devices to then be leveraged to modify actions performed on behalf of a user. For example, a user may be in an environment with a plurality of internet-of-things (IoT) devices, mobile computing devices (e.g., a smartphone, a tablet, a smart watch, etc.), car, and/or a laptop with ambient companion. The user can then ask the companion (via the input sensors of the computing devices) about a trip to a nearby recreation area. The ambient companion can then obtain and/or determine the input in a manner that may take into account all devices in the environment. The input determination and/or providing the response may include responding to the query across more than one device. For example, the companion may identify the typical routes and/or destinations and may generate certain visualizations that can be provided within the maps applications of one or more particular computing devices. The car companion variant of the agent may perform local inference and may determine the car will need recharging to go to one or more of the destinations. On the maps app used by the main agent companion handling, the query may be processed to output the relevant charging stations that are highlighted on the routes illustrated.

In some implementations, the systems and methods disclosed herein can be utilized to generate and/or provide interfaces across different computing devices that may be interconnected and/or have similar style, layout, and/or semantics regardless of the manufacturer and/or operating system for the computing devices. For example, the systems and methods may generate interfaces that obfuscate the differences between native interfaces and/or operating systems for different computing devices from different manufacturers.

The systems and methods can include a fluid cross-device representation. The cross-device representation can be provided based on outputs of a foundational model that can condition the input/output behavior on multiple devices and surfaces (e.g., apps). The cross-device representation may be implemented via (1) a centralized foundation model running in the cloud where device nodes report directly; (2) a hybrid model, where a centralized foundational model works with decentralized local large models that can perform inference using device specific context and coordinate solving the higher task with main model; and/or (3) a decentralized architecture, where individual devices have their versions of companions and are put together in the same physical space or in the same logical unit by a user owning them all. Certain levels of reasoning may be needed (e.g. >10B params) such that models can interact with one another.

The hybrid approach may be implemented via a plurality of different configurations, which may include adaptations for centralized and/or decentralized architectures.

For example, the user may have several registered interconnected devices. The characteristics of these devices may be known and/or determined. The degree of interoperability may vary, and may include an API that, if plugged into, the devices can be fully controlled. The API may be utilized by the device speakers for outputting audio. The API may be utilized for rendering elements on the operating system directly (and/or complex functionality within apps, etc.).

The API may be exposed in various configurations based on whether a local foundation model is present. If the foundation model is not present, then the raw functions may be described in some documentation library accessible and/or alternatively a natural language interface may be available if a local model is present and offered. The device may also offer functionality that interfaces with other external systems (e.g., sensors available for reading environment temperature, operating the window blinds, and/or autonomously navigating through the home to perform certain tasks). API examples and information may be fed into a foundational model that powers an ambient companion agent in a manner that can be utilized for conditioning response generation and task solving on behalf of the user.

The prompt generation can include obtaining and/or generating zero-shot or few-shot prompts for the foundation model to process to understand how to use an API of a device. If insufficient, the devices can have small datasets associated with them (e.g., around 1000 examples that can be used for prompt-tuning and/or weights for the foundational model to understand how to operate the devices). The examples can include task→decomposition using APIs.

Once surfaced, devices can be put together through a network where each device is a node. The edges of this network may be persistent (e.g. always-on) and/or may have some weight associated that quantifies how related two devices are at a certain time. For example, two devices may be in very close proximity to each other, and the weights between two devices may quantify this information by having smaller/larger numeric values. Two devices may also share certain contexts (e.g., if they interoperate and/or display the same app (e.g., the state can also be encoded in the edges of the graph dynamically through message passing)).

The devices available may be queried at inference time. The querying can be fed as a list with metadata and/or can be represented through a graph network which may also be fed into the ambient companion foundation model at inference time. Prior to the model inference, the foundational model may have been fine-tuned to work with the device network topologies and/or features. The graph network can be a modality that the foundational model can operate with. In some implementations, the network can be serialized directly and may be passed as part of the prompt to the generative model (e.g., the LLM). If insufficient, the large foundation models that power the ambient companions may be fine-tuned using multi-device graph network examples, (e.g., also with 1000 or more examples, where each example would have some task→step-by-step decomposition on how to use the multiple devices in resolving the task better).

In some implementations, the systems and methods can include prompting an LLM (or other generative model) with examples (e.g., "[device contexts] [response] [metadata: this response is suitable for smart speakers at breakfast time]" and/or "[device contexts] [response] [metadata: response can be visualized by rendering a UI with three checkboxes for each answer on a phone]"). For device decomposition examples, the prompt may include "[device contexts] [response] [metadata: this response should be passed to a smart speaker and a small notification should be shown on the phone with a summary, as the user may not be next to the speaker]". Then the user may face one of their devices and may decide to interface with the ambient companion.

The input may be highly dependent on the specifics of the form factors. For example, as the user pulls out their phone, the companion may activate in a voice only manner. When the phone is locked or as the user unlocks their phone, the companion may render itself in a UI that allows keyboard input. The device-state-dependent modality may be conditioned on the user's context in relationship with the nearby devices. For example, if the user's watch is available, the voice input may activate there instead.

The queries issued may be resolved through the help of all the devices. For example, if the user issues a statement of type "I should go to bed soon, when do I need to wake up tomorrow?", the system may trigger the foundational model to use all context available from devices and act on the query and/or the context. Based on the determined action, the response may first process a surface that has access to work and/or calendar context and respond on the speaker with some actual suggested time.

The processing may continue, for example, in a smart home, the lightning system may determine the intent of the user to go to sleep and may activate its local inference companion to set the lightning to slowly adjust to a user's determined bedtime routine. The information may be communicated visually and may be rendered as a UI element on the user's phone and/or watch such that they know of the decision.

There may be a proactive component to the ambient LLM companion. For example, some of the devices may be interacted with to determine whether a user input is needed. For example, companion enabled devices that have sensors and can operate a device autonomously, may determine based on the context of a user that an input is to be received and/or a prompt is to be generated.

In some implementations, the car companion may be built internally. The car companion may be prompted, configured, and/or trained to plan that fifteen minutes prior to the inferred user's leave time, the user checks the temperature, rain, etc., and in response to the prompting, configuration, and/or training, the car companion may notify the user to perform an action (e.g., pick-up X) and/or not forget to get a raincoat.

The determined context can be received by the ambient companion and the surface through which it is communicated to the user may be decided there. For example, the companion may decide to use the smart speaker (e.g., an audio notification: "it's raining and your car can pick you up instead of having to walk to the parking lot"). Alternatively and/or additionally, the system may render the same information and/or action on the user's watch based on a device usage context.

Across all the devices, there can be unifying behaviors in terms of inputs and/or outputs that can enable branding elements. The unifying behavior can be possible through device-specific prompting and few-shot examples available. The devices can come equipped with ten seconds of audio for five voice samples. The devices may also come equipped with five UI examples of how an assistant may be rendered on that specific device. The ambient foundation model can be conditioned to generate responses on those examples and generate interface uniform outputs that the user may be familiar with from that manufacturer.

A hybrid framework approach may include devices that have some degree of autonomy but may typically interoperate through a centralized companion. Variations may include where the devices have no capability to run their local foundational model and then the entirety of decisions may be made by the centralized companion. The variation approach may include constant streaming of information. Another variation can include where the devices have complete autonomy and there isn't a central companion. In the no central companion approach, the network backbone may be of more importance and may guide what devices are interconnected at a certain time to solve a given query, based on simpler signals.

The systems and methods disclosed herein can connect fragment systems using generative artificial intelligence models and unlocking brand new values to users by providing a singular service level companion.

The capabilities of a conversational interface (chatbots) may extend beyond Q&A associated with a singular device and/or application. For example, a user may be looking at a shopping blog and say, "show me the reviews for the products recommended by this article/video". The system may need an understanding of what the products are, to fetch reviews from the Shopping Graph, and to summarize those in an easy to compare manner. In another example, a user may be looking at a recipe and say, "add the ingredients to my Shopping App basket". The system may then need to extract ingredients and call a Shopping App API. In another example, a user may be looking at a travel vlog and say, "show the places mentioned in this article/video on a Map". The system may need an understanding of the places mentioned, to extract addresses, and to call an API to create pins on a custom map app. In another example, while viewing a document app, a user may be writing an essay on Abraham Lincoln by asking "write a 1000 word essay about Lincoln, focusing on the civil war, to explain his challenges in a way that a 5th grader would understand". The system may therefore need an understanding of key facts for Lincoln, list of his books, content in those books, historian articles, and to summarize all this information. In another example, while viewing a map app, a user may be looking at the map in a zoom level and say, "show me a video of things to do around here". The system may require an understanding of the key things to do in the location, places mentioned on videos, and retrieving the right video(s). In another example, while viewing content on a phone, a user may be on a screen for a trail hiking app and say, "show me restaurants near the trailhead". The system may therefore need to understand the location of the trailhead on the screen being viewed and may get local results for restaurants near that location.

The underlying reliance can be that the chatbots on these products, regardless of how they are integrated, may rely on common elements of reasoning, grounding, retrieval, function calling, user state, personal preferences, etc., many of these coming from search and/or knowledge graph services.

The systems and methods disclosed herein can utilize a chatbot large language model (LLM), a search understanding large language model and search engine, a cloud services large language model, and/or one or more other model-enabled systems. The architectures for the chatbot large language model (LLM) and a search understanding large language model and search engine may appear to be identical, but they may be implemented independently, with differences in each block, such as different RLHF (Reinforcement learning from human feedback) training, different planning algorithms, different sets of third-party plugins, different interfaces to search backends, and/or other differences. The different pipelines and/or systems may exchange information for inferences, understanding, and/or context determination. Separate architecture can allow for products to be developed independently and iteratively. However, while adhering to an optimal process may ensure the success of individual products, failure to adopt a holistic service-oriented approach may result in eventual disconnect between the products.

FIG. 5 depicts an example architecture that builds a layer cake of chatbot capabilities which can be implemented, and a set of instantiations of a chatbot service that lends appropriate context and personality that may be relevant for the product where the service is instantiated.

For example, there may be a common chatbot service that is built on a capable LLM, is fine tuned for common tasks like instruction following, has access to search backends, has access to 1p/3p APIs and an ability to call functions, etc. Examples of a few services that can be leveraged for obtaining inputs and/or determining context can include search platforms (e.g., to obtain succinct and factual data with access to a user search history), a document application (e.g., to obtain verbose and creative data, with access to document files, emails, current mail/file being viewed, favorites, etc.), and/or browser applications (e.g., to obtain succinct and factual data, with access to current tab, other tabs, bookmarks, history, etc.).

In some implementations, the systems and methods can include fine tuning the underlying model differently for different products using examples and content specific to the use case.

The systems and methods disclosed herein can include a companion model (e.g., a foundation model that may include a prompt generation model and/or a generative model).

By integrating the AI and LLM capabilities as standalone entities within the user interface (UI), separate from any other user activities, the systems and methods may ensure the persistent availability for immediate access whenever the user requires them. The integration can allow the AI and LLM to remain open and seamlessly connect with user actions as they transition between various applications and tasks.

The configuration can be helpful for users who want to quickly access information or perform tasks without having to leave the app they are currently using. Additionally, the persistent system can be helpful for users who want to use the companion along with other products. For example, a user may use the companion to search for information on a topic while they are also using a maps application to navigate.

The systems and methods can offer two additional benefits. Firstly, the system can obviate the need to build upon existing solutions with potentially incompatible architectures, thereby avoiding potential integration challenges. Secondly, not changing the existing solutions, which users are already accustomed to, may minimize the disruption caused by introducing significant changes that may not be optimal.

If a user is looking at a product in a store, the user can use the LLM to get information about the product (e.g., the price, reviews, and specifications). The user may also use the camera to take a picture of the product and then use the LLM to search for similar products online. The multi-faceted system may allow the user to get all the information the user needs to know about a product without having to leave the store.

Another example can be if a user is looking at a painting in a museum, a user can use the LLM to get information about the artist, the painting, and the history of the painting. The user may also use the camera to take a picture of the painting and then use the LLM to search for other paintings by the same artist or paintings with similar themes. The system can allow the user to learn more about the art you are looking at without having to rely on the information provided by the museum.

In some implementations, a user can be looking for a product but may be unable to find what they are looking for. The user may then open their phone and describe the product they are looking for, and the phone will search for and find the product.

The systems and methods can leverage the ambient ecosystem by allowing users to connect their other devices as companions. The connection can allow users to have a more seamless and integrated experience across their devices. For example, a user may start a task on their phone and then continue the task on their laptop without having to re-enter any information. The ambient ecosystem can create a more personalized and convenient experience for users.

Figure 9A:
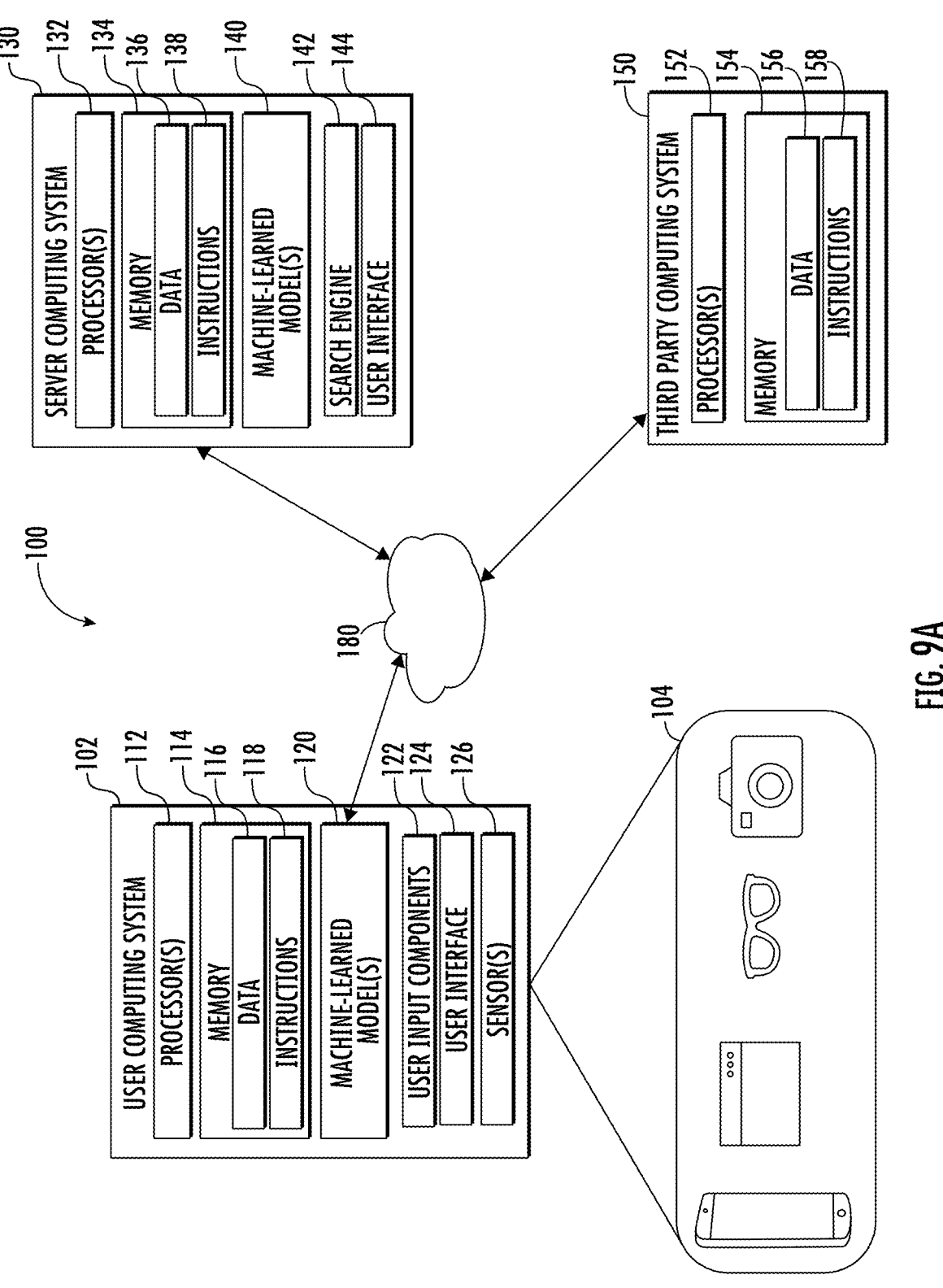
FIG. 9A depicts a block diagram of an example computing system that performs multi-device output management according to example embodiments of the present disclosure.

FIG. 9A depicts a block diagram of an example computing system 100 that performs multi-device output management according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 130 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or pe part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 9B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 9B:
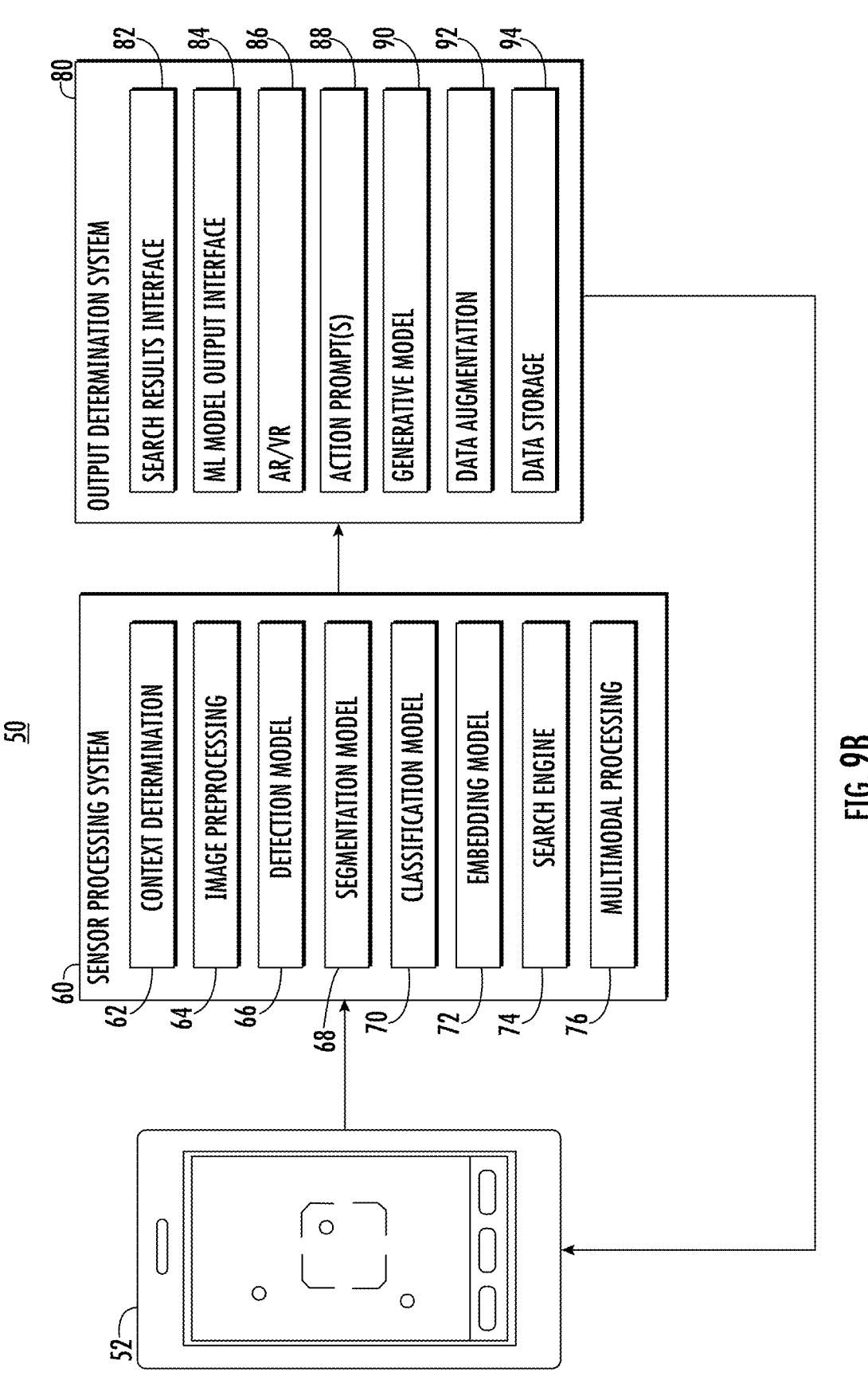
FIG. 9B depicts a block diagram of an example computing system that performs multi-device output management according to example embodiments of the present disclosure.

FIG. 9B depicts a block diagram of an example computing system 50 that performs multi-device output management according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 90 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 90 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 90 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 90 can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models 90 may include a vision language model. The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g. for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for processing inputs within a multi-device environment, the method comprising:

obtaining, by a computing system comprising one or more processors, input data comprising a plurality of inputs from two or more user computing devices;

obtaining, by the computing system, environment data descriptive of a plurality of computing devices in an environment of the two or more user computing devices, wherein the plurality of computing devices are associated with a plurality of different output components;

determining, by the computing system, output capabilities for plurality of computing devices based on the environment data;

generating, by the computing system, a representation of performance capabilities of the plurality of computing devices;

generating, by the computing system, a prompt based on the representation of performance capabilities of the plurality of computing devices and the input data, wherein the prompt comprises data descriptive of the plurality of inputs and device information associated with at least a subset of the plurality of computing devices;

generating, by the computing system, a response to the input data based on processing the data descriptive of the plurality of inputs of the prompt with a generative model fine-tuned for a multi-device framework;

generating, by the computing system and with the generative model and based on the representation and the response, a model-generated output comprising a plurality of predicted features to be provided with a particular computing device of the plurality of computing devices based on the device information; and transmitting, by the computing system, the model-generated output to the particular computing device.

2. The method of claim 1, wherein obtaining, by a computing system comprising one or more processors, the input data from the two or more user computing devices comprises:

obtaining, by the computing system, a first input from a first user computing device;

obtaining, by the computing system, a second input from a second user computing device based on the first input; and generating, by the computing system, the input data based on the first input from the first user computing device and the second input from the second user computing device.

3. The method of claim 2, wherein obtaining, by the computing system, the first input from the first user computing device comprises:

obtaining, by the computing system, the first input of a first input type with a first input component of the first user computing device; and wherein obtaining, by the computing system, the second input from the second user computing device based on the first input comprises:

obtaining, by the computing system, the second input of a second input type with a second input component of the second user computing device, wherein the first input type and the second input type differ, and wherein the first input component and the second input component differ.

4. The method of claim 3, wherein the first input component of the first user computing device comprises an audio sensor of a smart phone for obtaining audio data, and wherein the second input from the second user computing device comprises an operating system assistant of a smart television for obtaining data associated with content currently provided for display.

5. The method of claim 1, wherein obtaining, by a computing system comprising one or more processors, the input data from the two or more user computing devices comprises:

obtaining, by the computing system, data descriptive of content currently provided for display on a first user computing device;

determining, by the computing system, a set of features within the content currently provided for display that a user is likely to have interest in searching;

in response to determining the set of features within the content currently provided for display that the user is likely to have interest in searching, providing, by the computing system, a suggested entry point user interface element rendered over the content currently provided for display on the first user computing device;

providing, by the computing system, the suggested entry point user interface element on a second user computing device.

6. The method of claim 5, wherein obtaining, by a computing system comprising one or more processors, the input data from the two or more user computing devices further comprises:

obtaining, by the computing system, a selection of the suggested entry point user interface element on the second user computing device;

obtaining, by the computing system, a second input from a second user computing device based on the first input; and generating, by the computing system, the input data based on the data descriptive of content currently provided for display on the first user computing device and the second input from the second user computing device.

7. The method of claim 1, wherein the representation comprises a fluid cross-device representation generated to condition the input-output prediction associated with multiple devices.

8. The method of claim 1, wherein the plurality of inputs comprise a blog and a voice command descriptive of a request for additional details related to products within the blog; and wherein generating, by the computing system, the response to the input data comprises:

determining the products discussed within the blog; and retrieving additional details related to the products.

9. The method of claim 8, wherein generating, by the computing system and with the generative model and based on the representation and the response, the model-generated output comprises:

generating the model-generated output that compares the products based on the additional details.

10. The method of claim 8, wherein the additional details are retrieved via an application programming interface.

11. A computing system for processing inputs within a multi-device environment, the system comprising:

one or more processors; and one or more non-transitory computer-readable media that collectively store instructions that, when executed by the one or more processors, cause the computing system to perform operations, the operations comprising:

obtaining input data comprising a plurality of inputs from two or more user computing devices;

obtaining environment data descriptive of a plurality of computing devices in an environment of the two or more user computing devices, wherein the plurality of computing devices are associated with a plurality of different output components;

determining output capabilities for plurality of computing devices based on the environment data;

generating a representation of performance capabilities of the plurality of computing devices;

generating a prompt based on the representation of performance capabilities of the plurality of computing devices and the input data, wherein the prompt comprises data descriptive of the plurality of inputs and device information associated with at least a subset of the plurality of computing devices;

generating a response to the input data based on processing the data descriptive of the plurality of inputs of the prompt with a generative model fine-tuned for a multi-device framework;

generating, with the generative model and based on the representation and the response, a model-generated output comprising a plurality of predicted features to be provided with a particular computing device of the plurality of computing devices based on the device information; and transmitting the model-generated output to the particular computing device.

12. The system of claim 11, wherein the plurality of inputs comprise a travel blog and a voice command descriptive of a request for a map output to be generated based on the travel blog; and wherein generating the response to the input data comprises:

determining a plurality of places mentioned within the travel blog;

determining a plurality of addresses for the plurality of places mentioned within the travel blog.

13. The system of claim 12, wherein generating, with the generative model and based on the representation and the response, the model-generated output comprises:

generating a custom map that comprises a plurality of pins descriptive of the plurality of addresses for the plurality of places mentioned within the travel blog.

14. The system of claim 11, further comprising:

a chatbot language model for processing and responding to the plurality of inputs;

a search engine language model for generating the response to the input data; and a search engine for retrieving search results associated with the input data.

15. The system of claim 14, wherein the chatbot language model and the search engine language model are trained separately.

16. The system of claim 11, wherein the two or more user computing devices comprise a smartphone and a smartwatch, and wherein the particular computing device comprises a smart speaker.

17. One or more non-transitory computer-readable media that collectively store instructions that, when executed by one or more computing devices, cause the one or more computing devices to perform operations, the operations comprising:

obtaining input data comprising a plurality of inputs from two or more user computing devices;

obtaining environment data descriptive of a plurality of computing devices in an environment of the two or more user computing devices, wherein the plurality of computing devices are associated with a plurality of different output components;

determining output capabilities for plurality of computing devices based on the environment data;

generating a representation of performance capabilities of the plurality of computing devices;

generating a prompt based on the representation of performance capabilities of the plurality of computing devices and the input data, wherein the prompt comprises data descriptive of the plurality of inputs and device information associated with at least a subset of the plurality of computing devices;

generating a response to the input data based on processing the data descriptive of the plurality of inputs of the prompt with a generative model fine-tuned for a multi-device framework;

generating, with the generative model and based on the representation and the response, a model-generated output comprising a plurality of predicted features to be provided with a particular computing device of the plurality of computing devices based on the device information; and transmitting the model-generated output to the particular computing device.

18. The one or more non-transitory computer-readable media of claim 17, wherein the plurality of inputs comprise a text input and a voice command.

19. The one or more non-transitory computer-readable media of claim 17, wherein the plurality of inputs comprise a text input and a gesture input.

20. The one or more non-transitory computer-readable media of claim 17, wherein the model-generated output comprises a video to provide for display via a visual display of the particular computing device.

* * * * *